US008160943B2

(12) United States Patent
Smith et al.

(10) Patent No.: US 8,160,943 B2
(45) **Date of Patent: *Apr. 17, 2012**

(54) SYSTEMS AND METHODS TO PROCESS TRANSACTIONS BASED ON SOCIAL NETWORKING

(75) Inventors: Glyn Barry Smith, Chesterfield (GB); Ron Hirson, San Francisco, CA (US); Nicholas Reidy, San Francisco, CA (US)

(73) Assignee: Boku, Inc., San Francisco, CA (US)

(*) Notice: Subject to any disclaimer, the term of this patent is extended or adjusted under 35 U.S.C. 154(b) by 180 days.

This patent is subject to a terminal disclaimer.

(21) Appl. No.: 12/473,230

(22) Filed: May 27, 2009

(65) Prior Publication Data

US 2010/0250687 A1 Sep. 30, 2010

Related U.S. Application Data

(60) Provisional application No. 61/164,371, filed on Mar. 27, 2009.

(51) Int. Cl.
*G06Q 40/00* (2012.01)
*G06Q 20/00* (2012.01)

(52) U.S. Cl. ............................... 705/35; 705/39; 705/64

(58) Field of Classification Search ............... 705/35–45
See application file for complete search history.

(56) References Cited

U.S. PATENT DOCUMENTS 5,708,422 A 1/1998 Blonder et al.
5,845,260 A 12/1998 Nakano et al.
5,905,873 A 5/1999 Hartmann et al.
5,914,472 A 6/1999 Foladare et al.
5,953,710 A 9/1999 Fleming
6,227,447 B1 5/2001 Campisano
6,302,326 B1 10/2001 Symonds et al.
6,473,808 B1 10/2002 Yeivin et al.
(Continued)

FOREIGN PATENT DOCUMENTS

GB 2379525 3/2003
(Continued)

OTHER PUBLICATIONS

Zong Mobile Payment Demo on a Facebook App. Youtube upload by ZongTV. Jan. 5, 2009.http;//www.youtube.com/watch?v=aLjRcAFrGil.*

(Continued)

*Primary Examiner* — Sarah Monfeldt
*Assistant Examiner* — Stephanie M Ziegle
(74) *Attorney, Agent, or Firm* — Stephen M. De Klerk

(57) ABSTRACT

Systems and methods to verify and process requests received via social networking websites. In one aspect, a system includes a data storage facility to store data associated with a first phone number; and an interchange coupled with the data storage facility. The interchange includes a common format processor and a plurality of converters to interface with a plurality of controllers of mobile communications. The converters communicate with the controllers in different formats and with the common format processor in a common format. The common format processor receives a request from a first user via a social networking website, identifies a first phone number of the first user and a second phone number of a second user, based on the social networking website, and uses the converters to communicate with at least one of the mobile phones at the first and second phone numbers to confirm and/or approve the request.

17 Claims, 17 Drawing Sheets

Receive an indication of association between a first phone number and a second phone number 301

Store data to associate the first phone number and the second phone number 303

Receive a payment request including the first phone number 305

Identify the second phone number based on the association between the first phone number and the second phone number 307

Confirm the request via communication with a mobile device at the first phone number 309

Approve the request via communication with a mobile device at the second phone number 311

Collect funds from the user of the mobile device at the second phone number for the request 313

U.S. PATENT DOCUMENTS 6,612,488 B2 9/2003 Suzuki
6,718,178 B1 4/2004 Sladek et al.
6,788,771 B2 9/2004 Manto
6,807,410 B1 10/2004 Pailles et al.
6,928,558 B1 8/2005 Allahwerdi et al.
6,965,872 B1 11/2005 Grdina
6,996,409 B2 2/2006 Gopinath et al.
7,013,125 B2 3/2006 Henrikson
7,107,068 B2 9/2006 Benzon et al.
7,174,301 B2 2/2007 Florance et al.
7,221,951 B2 5/2007 Anvekar et al.
7,292,996 B2 11/2007 Nobrega et al.
7,308,254 B1 12/2007 Rissanen
7,315,541 B1 1/2008 Housel et al.
7,357,310 B2 4/2008 Calabrese et al.
7,366,702 B2 4/2008 David
7,374,079 B2 5/2008 Nam et al.
7,437,331 B1 10/2008 Rosenberger
7,458,507 B2 12/2008 Fillinger et al.
7,478,055 B2 1/2009 Goino
7,487,114 B2 2/2009 Florance et al.
7,747,746 B2 * 6/2010 Thayer et al. ................ 709/225
7,748,614 B2 7/2010 Brown
7,752,135 B2 7/2010 Brown et al.
7,870,077 B2 1/2011 Woo et al.
7,890,433 B2 2/2011 Singhal
2001/0003093 A1 6/2001 Lundin
2001/0037264 A1 11/2001 Husemann et al.
2002/0013727 A1 1/2002 Lee
2002/0016769 A1 * 2/2002 Barbara et al. .................. 705/40
2002/0035539 A1 3/2002 O'Connell
2002/0059146 A1 5/2002 Keech
2002/0087471 A1 * 7/2002 Ganesan et al. ................ 705/40
2002/0120582 A1 8/2002 Elston et al.
2002/0193094 A1 12/2002 Lawless et al.
2003/0065525 A1 4/2003 Giacchetti et al.
2003/0119478 A1 6/2003 Nagy et al.
2003/0125969 A1 7/2003 Kizer et al.
2003/0126076 A1 7/2003 Kwok
2004/0019564 A1 1/2004 Goldthwaite et al.
2004/0044582 A1 3/2004 Chowdhary
2004/0122685 A1 6/2004 Bunce
2004/0248596 A1 12/2004 Panchal
2005/0055296 A1 3/2005 Hattersley et al.
2005/0055309 A1 3/2005 Williams et al.
2005/0177442 A1 8/2005 Sullivan et al.
2005/0177517 A1 8/2005 Leung et al.
2005/0199709 A1 9/2005 Linlor
2005/0245257 A1 11/2005 Woodhill
2006/0131390 A1 6/2006 Kim
2006/0206709 A1 9/2006 Labrou et al.
2006/0253335 A1 11/2006 Keena et al.
2006/0258331 A1 11/2006 Syrett et al.
2006/0259438 A1 11/2006 Randle et al.
2006/0276171 A1 12/2006 Pousti
2007/0005467 A1 1/2007 Haigh et al.
2007/0022019 A1 1/2007 Sherwin et al.
2007/0027775 A1 2/2007 Hwang
2007/0027803 A1 2/2007 Brandes et al.
2007/0043664 A1 2/2007 Wilkes
2007/0055440 A1 3/2007 Denker et al.
2007/0061244 A1 3/2007 Ramer et al.
2007/0094080 A1 4/2007 Wiken
2007/0118477 A1 5/2007 Graves et al.
2007/0123219 A1 5/2007 Lovell, Jr.
2007/0123229 A1 5/2007 Pousti
2007/0130025 A1 6/2007 Nakajima
2007/0130044 A1 6/2007 Rowan
2007/0175978 A1 8/2007 Stambaugh
2007/0198510 A1 * 8/2007 Ebanks ............................ 707/5
2007/0203836 A1 8/2007 Dodin
2007/0208632 A1 9/2007 Downes et al.
2007/0233597 A1 10/2007 Petersen et al.
2007/0244731 A1 10/2007 Barhydt et al.
2007/0244811 A1 10/2007 Tumminaro et al.
2007/0255653 A1 11/2007 Tumminaro et al.
2007/0255662 A1 11/2007 Tumminaro et al.
2007/0260556 A1 11/2007 Pousti
2007/0266034 A1 11/2007 Pousti
2007/0266130 A1 11/2007 Mazur et al.
2007/0270125 A1 11/2007 Pousti
2008/0009263 A1 1/2008 Pousti
2008/0010192 A1 1/2008 Rackley, III et al.
2008/0040139 A1 2/2008 Pousti
2008/0040265 A1 2/2008 Rackley, III et al.
2008/0040733 A1 2/2008 Pousti
2008/0052091 A1 2/2008 Vawter
2008/0052363 A1 2/2008 Pousti
2008/0057904 A1 3/2008 Pousti
2008/0082509 A1 4/2008 Bessieres et al.
2008/0091614 A1 4/2008 Bas Bayod et al.
2008/0103984 A1 5/2008 Choe et al.
2008/0109279 A1 5/2008 Csoka
2008/0109528 A1 5/2008 Knight et al.
2008/0120698 A1 5/2008 Ramia
2008/0126145 A1 5/2008 Rackley, III et al.
2008/0133403 A1 * 6/2008 Hamzeh .......................... 705/39
2008/0133735 A1 6/2008 Thayer et al.
2008/0140569 A1 6/2008 Handel
2008/0154772 A1 6/2008 Carlson
2008/0167017 A1 7/2008 Wentker et al.
2008/0177628 A1 7/2008 Payette
2008/0189186 A1 8/2008 Choi et al.
2008/0189211 A1 8/2008 Obadia et al.
2008/0201201 A1 8/2008 Pousti
2008/0208739 A1 8/2008 Phillips
2008/0228595 A1 9/2008 Hill et al.
2008/0233918 A1 9/2008 Pousti
2008/0275779 A1 11/2008 Lakshminarayanan
2008/0287095 A1 11/2008 Pousti
2008/0288299 A1 11/2008 Schultz
2009/0006184 A1 1/2009 Leach et al.
2009/0006217 A1 1/2009 Smith
2009/0024614 A1 1/2009 Pousti
2009/0029687 A1 * 1/2009 Ramer et al. ............... 455/414.3
2009/0063178 A1 3/2009 Pousti et al.
2009/0063312 A1 3/2009 Hurst
2009/0070583 A1 3/2009 Von Mueller et al.
2009/0081989 A1 3/2009 Wuhrer
2009/0112765 A1 4/2009 Skowronek
2009/0119190 A1 5/2009 Realini
2009/0124238 A1 5/2009 Wilson
2009/0156170 A1 6/2009 Rossano et al.
2009/0172402 A1 7/2009 Tran
2009/0182634 A1 7/2009 Park et al.
2009/0192928 A1 * 7/2009 Abifaker ......................... 705/35
2009/0204546 A1 8/2009 Haidar
2009/0220060 A1 9/2009 Wilson
2009/0265273 A1 10/2009 Guntupalli et al.
2010/0010911 A1 1/2010 Smith
2010/0015944 A1 1/2010 Smith
2010/0015957 A1 1/2010 Smith
2010/0017285 A1 1/2010 Smith
2010/0094732 A1 4/2010 Smith
2010/0125514 A1 5/2010 Blackhurst et al.
2010/0153249 A1 6/2010 Yuan et al.
2010/0179907 A1 7/2010 Atkinson
2010/0190471 A1 7/2010 Smith
2010/0191646 A1 7/2010 Smith
2010/0191648 A1 7/2010 Smith
2010/0216425 A1 8/2010 Smith
2010/0217696 A1 8/2010 Schuba et al.
2010/0223183 A1 9/2010 Smith
2010/0235276 A1 9/2010 Smith
2010/0267362 A1 10/2010 Smith et al.
2010/0299220 A1 11/2010 Baskerville
2010/0299731 A1 11/2010 Atkinson
2010/0306015 A1 12/2010 Kingston
2010/0306099 A1 12/2010 Hirson
2010/0312645 A1 12/2010 Niejadlik
2010/0312678 A1 12/2010 Davis
2011/0010292 A1 1/2011 Giordano et al.
2011/0022484 A1 1/2011 Smith et al.
2011/0035264 A1 2/2011 Zaloom
2011/0035302 A1 2/2011 Martell et al.
2011/0071922 A1 3/2011 Hirson et al.
2011/0072039 A1 3/2011 Tayloe

| | | | |
|---|---|---|---|
| 2011/0078077 A1 | 3/2011 | Hirson |
| 2011/0082772 A1 | 4/2011 | Hirson |
| 2011/0125610 A1 | 5/2011 | Goodsall et al. |
| 2011/0143710 A1 | 6/2011 | Hirson |
| 2011/0143711 A1 | 6/2011 | Hirson |

FOREIGN PATENT DOCUMENTS

| | | |
|---|---|---|
| JP | 2007109014 | 4/2007 |
| JP | 2007179383 | 7/2007 |
| KR | 20000036574 | 7/2000 |
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | WO-2007004792 | 1/2007 |
| WO | WO-2007084593 | 7/2007 |
| WO | 2007102648 | 9/2007 |
| WO | 2007127521 | 11/2007 |
| WO | 2009044396 | 4/2009 |

OTHER PUBLICATIONS

Zong Mobile Payments in SmallWorlds. YouTube Upload by ZongTV. Feb. 10, 2009.http;//www.youtube.com/watch?v=Y6CEw3tSgBc.*

Chen, Will. Gift Shop Credits Have Arrived. The Facebook Blog. Oct. 31, 2008. http://blog.facebook.com/blog.php-?post=36577782130.*

Bruene, Jim. PayPal Launches on Facebook. Jun. 22, 2007.http://www.netbanker.com/2007/06/paypal__launches__on__facebook__who__wants__to__be__the__first__bank__on__facebook.html.*

Nicole, Kristen. Pay Me Lets You Send and Receive Money Though Facebook. Jun. 17, 2007. http://mashable.com/2007/06/17/pay-me-facebook-app.*

Zong—Mobile Payments for your Web App. YouTube upload by ZongTV. Sep. 5, 2008. .http;//www.youtube.com/watch?v=O2C3SQraAvQ.*

MobillCash: Worlds First in Mobile Payments. YouTube upload by rodbrooks. Oct. 12, 2007..http;//www.youtube.com/watch?v=j6Xv35qSmbg.*

OneBip—How to Pay Online with Your Mobile Phone. YouTube upload by oneBip. 236 May 2007. .http;//www.youtube.com/watch?v=RiEsMcc0tJY.*

Lee, Jessica. Payment Industry Perspectives: Q&A with Zong CEO David Marcus. May 19, 2009. http://www.insidefacebook.com/2009/05/19/payment-industry-persectives-qa-with-zong-ceo-david-marcus/.*

Zong Blog. Virtual Goods/Currency and Mobile Payments: the Business Model for Social Apps. Oct. 28, 2008. http://blog.zong.com/2008/10/25/virtual-goods-currency-and-mobile-payments-the-business-model-for-social-apps/.*

Arrington, Michael. Mobile Paymetns Getting traction on Social Networks but Fees are Sky High. Jan. 13, 2009.http://techcrunch.com/2009/01/13/mobile-payments-getting-traction-on-social-networks-but-fees-are-sky-high/.*

Amazon.com, Inc., "Get Gold Box Deals Every Day with Amazon Text Alerts," located at http://www.amazon.com/gp/anywhere/sms/goldbox, available at least by Jun. 10, 2009.

Aradiom Inc., "The Real Solution—Aradiom SolidPass", located at http://www.aradiom.com/SolidPass/2fa-OTP-security-token.htm, available at least by Apr. 24, 2009.

Chua, Lye Heng, "How Customers Applied Java CAPS?" Sun Microsystems, Inc. presentation, Nov. 6, 2007.

Hassinen, Marko et al., "An Open, PKI-Based Mobile Payment System," Emerging Trends in Information and Communication Security, Lecture Notes in Computer Science, vol. 3995/2006, pp. 86-89, Jun. 1, 2006.

International Application No. PCT/US2009/033823, International Search Report and Written Opinion, Sep. 24, 2009.

International Application No. PCT/US2009/039723, International Search Report and Written Opinion, Oct. 30, 2009.

International Application No. PCT/US2010/020189, International Search Report and Written Opinion, Dec. 10, 2010.

International Application No. PCT/US2010/021054, International Search Report and Written Opinion, Jul. 29, 2010.

International Application No. PCT/US2010/024525, International Search Report and Written Opinion, May 17, 2010.

International Application No. PCT/US2010/024535, International Search Report and Written Opinion, May 25, 2010.

International Application No. PCT/US2010/030338, International Search Report & Written Opinion, Jun. 3, 2010.

International Application No. PCT/US2010/032668, International Search Report and Written Opinion, Jul. 1, 2010.

International Application No. PCT/US2010/036940, International Search Report and Written Opinion, Jul. 21, 2010.

International Application No. PCT/US2010/037816, International Search Report and Written Opinion, Aug. 5, 2010.

International Application No. PCT/US2010/042703, International Search Report and Written Opinion, Sep. 13, 2010.

International Application No. PCT/US2010/046266, International Search Report and Written Opinion, Oct. 20, 2010.

International Application No. PCT/US2010/057472, International Search Report and Written Opinion, Jan. 18, 2011.

International Application No. PCT/US2010/059295, International Search Report and Written Opinion, Feb. 1, 2011.

International Application No. PCT/US2010/059466, International Search Report and Written Opinion, Feb. 1, 2011.

International Application No. PCT/US2011/022419, International Search Report and Written Opinion, Mar. 29, 2011.

International Application No. PCT/US2011/022426, International Search Report and Written Opinion, Mar. 28, 2011.

Mobilians Co. Ltd., company website located at http://www.mobilians.co.kr/english/, available at least by Janaury 12, 2009.

PayPal, Inc., "Get What You Want, When You Want It," located at https://www.paypal.com/cgi-bin/webscr?cmd=xpt/Marketing/mobile/MobileBuyStuff-outside, available at least by Mar. 5, 2009.

PayPal, Inc., "Texting with PayPal—Easy as Lifting a Finger," located at https://www.paypal.com/cgi-bin/webscr? cmd=xpt/Marketing/mobile/MobileAdvancedFeatures-outside, available at least by Mar. 5, 2009.

Squidoo, LLC, "Introducing MobillCash: Make a Secure Sale Even When an Online Customer Has No Cash, Credit Cards or I.D.," located at http://www.squidoo.com/mobillcash-pay-by-mobile-phone, available at least by Aug. 29, 2008.

Sun Microsystems Inc., "The Road to Mobile Banking," white paper, Jun. 2008.

Tindal, Suzanne, "St. George Counts Down to Two-Factor Authentication," ZDNet Australia, Feb. 19, 2008.

Trusted Mobile Payment Framework, "Scheme Rules," version 2.0, Aug. 6, 2008.

VISUALtron Software Corporation, "2-Factor Authentication—What is MobileKey?" located at http://www.visualtron.com/products__mobilekey.htm, available at least by 2008.

Wikimedia Foundation, Inc., "Authentication," located at en.wikipedia.org/wiki/Authentication, Mar. 17, 2009.

Wikimedia Foundation, Inc., "Credit Card," located at en/wikipedia.org/wiki/Credit__card, Dec. 5, 2008.

Wikimedia Foundation, Inc., "Security Token," located at en.wikipedia.org/wiki/Security__token, Apr. 13, 2009.

Wikimedia Foundation, Inc., "Two-Factor Authentication," located at en.wikipedia.org/wiki/Two-factor__authentication, Apr. 24, 2009.

Zabawskyj, Bohdan, "In the Media: The Mobile Money Opportunity," Billing World and OSS Today, located at http://www.redknee.com/news__events/in__the__media/43/?PHPSESSID=1e0ca1ab057bf9dc2c88104877ca8010, Sep. 2007.

European Patent Application No. 09711520.8, Extended Search Report mailed Apr. 27, 2011.

International Application No. PCT/US2010/050616, International Search Report and Written Opinion, Apr. 26, 2011.

International Application No. PCT/US2011/30039, International Search Repo and Written Opinion, May 23, 2011.

International Application No.: PCT/US2011/30038, International Search Report and Written Opinion, May 25, 2011.

OneBip S.R.L , "OneBip—to Pay Online with Your Mobile Phone", Youtube online vdeo at http://www.youtube.com/watch?v=,RiEsMcc0tJY, May 23, 2007.
Arrington, Michael , "Mobile Payments Getting Traction on Social Networks but Fees are Sky High", Tech Crunch, located a http://techcrunch.com/2009/01/13mobile-payments-getting-traction-on-social-networks-but-fees-are-sky-high/., Jan. 13, 2009.
Brooks, Rod , "MobilCash:Worlds First in Mobile Payments", YouTube online video located at http://youtube.com/watch?v=j6Xv35qSmbg., Oct. 12, 2007.
Bruene: Jim , "PayPal Launches on Facebook: Who Wants to be the First Bank?", located at http://www.netbanker.com/2007/06paypal__launches__on__facebook__who__wants__to__be__the__first__bank__on__facebook.hml, Jun. 22, 2007.
Chen, Will , "Gift Shop Credits Have Arrived", The Facebook Slog, located at gttp://blog.facebook.com/blog.php?post=36577782130, Oct. 31, 2008.
Federal Trade Commission, "Children's Online Privacy Protection Act (COPPA)", 15 U.S.C. §§ 6501-6506, Oct. 21, 1998.
Ihlwan, Moon , "In Korea, Cell Phones Get a New Charge", http://businessweek.com/globalbiz/content/mar2006/gb20060301__260288.htm, Mar. 1, 2006.
Lee, Jessica , "Payment Industry Perspectives: Q&A with Zong CEO David Marcus", http://www.insidefacebook.com/2009/05/19payment-industry-perspectives-qa-with-zong-ceo-david-marcus, Jun. 19, 2009.
Nicole, Kirsten , "Pay me Lets You Send and Receive Money Through Facebook", http://mashable.com/2007/06/17pay-me-facebook-app, Jun. 17, 2007.
Zong, Inc., "Virtual Goods/Currency and Mobile Payments: The Business Model for Social Apps", The Zong Blog at http://blog-zong.com/2008/10/25/virtual-goods-currency-and-mobile-payments-the business-model-for-social-apps/, Oct. 28, 2008.
Zong, Inc., "Zong Mobile Payment Demo on a Facebook App", You Tube online video at http://www.youtube.com/watch?v=aLjRcAFrGil, Jan. 5, 2009.
Zong, Inc. "Zong- Mobile Payments for Your Web App", You tube online video at http://www.youtube.com/watch?v=O2G3SQraAvQ, Sep. 5, 2008.
Zong, Inc., "Zong Mobile Payments in Smallworlds", You Tube online video at http://www.youtube.com/watch?v=Y6CEw3tSgBc, Feb. 10, 2009.

* cited by examiner

Billing Engine 157
Decision Engine 151
Rules 141
Regulations 143
Mobile Message Generator 153
Limits 145
Records 147
Restrictions 149

Common Format Processor 133

Purchase Request
User Terminal 111
Server 113
177
Account Server 125
172
Charge
Charge Request
Interchange 101
179
Data Storage Facility 107
Account Info 121
173
Mobile Phone B 117
Confirmation
Phone Number B 122
Phone Number A 123
174
Mobile Phone A 116
Approval

SYSTEMS AND METHODS TO PROCESS TRANSACTIONS BASED ON SOCIAL NETWORKING

The present application claims priority to Provisional U.S. Patent Application Ser. No. 61/164,371, filed Mar. 27, 2009 and entitled "Systems and Methods to Process Transactions Based on Social Networking," the disclosure of which is hereby incorporated herein by reference.

The present application is related to U.S. patent application Ser. No. 12/473,217, filed concurrently herewith on May 27, 2009, entitled "Systems and Methods to Process Transactions Based on Social Networking" and naming inventors Ron Hirson and Nicholas Reidy, the disclosure of which is hereby incorporated herein by reference.

FIELD OF THE TECHNOLOGY

At least some embodiments of the disclosure relate to mobile communications in general and, more particularly but not limited to, mobile communications to control online transactions.

BACKGROUND

Short Message Service (SMS) is a communications protocol that allows the interchange of short text messages between mobile phone devices. SMS messages are typically sent via a Short Message Service Center (SMSC) of a mobile carrier, which uses a store-and-forward mechanism to deliver the messages. When a mobile phone is not reachable immediately for the delivery of the message, the SMSC stores the message for later retry.

SMS messages can be sent via gateways. Some gateways function as aggregators. An aggregator typically does not have the capacity to deliver the messages directly to the mobile phones. An aggregator typically interfaces with and relies upon the SMSC of a mobile carrier to deliver SMS messages.

Some gateways function as providers that are capable of sending text messages to mobile devices directly, without going through the SMSC of other mobile operators.

Text messaging between mobile phones can also be performed using other protocols, such as SkyMail and Short Mail in Japan.

Some mobile carriers provide email gateway services to allow text messages to be sent to mobile phones via email. For example, a non-subscriber of the mobile carrier may send a message to an email address associated with a mobile phone of a subscriber of the mobile carrier to have the message delivered to the mobile phone via text messaging.

Emails can also be sent to mobile phone devices via standard mail protocols, such as Simple Mail Transfer Protocol (SMTP) over Internet Protocol Suite (commonly TCP/IP, named from two of the protocols: the Transmission Control Protocol (TCP) and the Internet Protocol (IP)).

Short messages may be used to provide premium services to mobile phones, such as news alerts, ring tones, etc. The premium content providers may send the messages to the SMSC of the mobile operator using a TCP/IP protocol, such as Short Message Peer-to-peer Protocol (SMPP) or Hypertext Transfer Protocol, for delivery to a mobile phone; and the mobile phone is billed by the mobile operator for the cost of receiving the premium content.

Premium services may also be delivered via text messages initiated from the mobile phone. For example, a televoting service provider may obtain a short code to receive text messages from mobile phones; and when the user sends a text message to the short code, the mobile carrier routes the message to the televoting service provider and charges the user a fee, a portion of which is collected for the televoting service provider.

SUMMARY OF THE DESCRIPTION

Systems and methods are provided to verify and process requests received via social networking websites. Some embodiments are summarized in this section.

In one aspect, a system includes a data storage facility to store data associated with a first phone number; and an interchange coupled with the data storage facility. The interchange includes a common format processor and a plurality of converters to interface with a plurality of controllers. The converters are configured to communicate with the controllers in different formats, and communicate with the common format processor in a common format.

In one embodiment, the common format processor is to receive a request from a user via a social networking website, which identifies the first phone number of the user. The common format processor is to communicate with the social networking website to identify a second phone number based on data stored in a social network database coupled to the social networking website, where the social network database associates the first phone number with the second phone number based on a social network of the user. The common format processor is to instruct a first controller of the controllers, via a first converter of the converters, to communicate with a mobile phone at the first phone number to confirm the request. In response to a confirmation of the request confirmed via the mobile phone at the first phone number, the system is to transfer funds between the user at the first phone number and a user at the second phone number according to the request.

In another aspect, a method includes: receiving at a server computer a request from a user via a social networking website, the request identifying a first phone number of the user; communicating by the server computer with the social networking website to identify a second phone number based on data stored in a social network database coupled to the social networking website; communicating by the server computer with a mobile phone at the first phone number to confirm the request; and in response to a confirmation of the request confirmed via the mobile phone at the first phone number, transferring funds between the user at the first phone number and a user at the second phone number according to the request.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, an interchange is used to interface with a plurality of different controllers of mobile communications, such as SMS messages. The interchange is coupled with a data storage facility that stores data associating two or more phone numbers of mobile devices, such as cellular phones, operated by different users. The interchange allows one of the mobile devices to control the purchase requests confirmed via the other mobile devices and/or to provide funds for the approved purchase requests. The interchange can be used to associate account information with phone numbers to facilitate electronic payments via the mobile devices, or to collect funds via the phone bills of the mobile devices. The interchange is configured to communicate with the mobile phones through the different controllers to provide security and convenience for online transactions.

Figure 1:
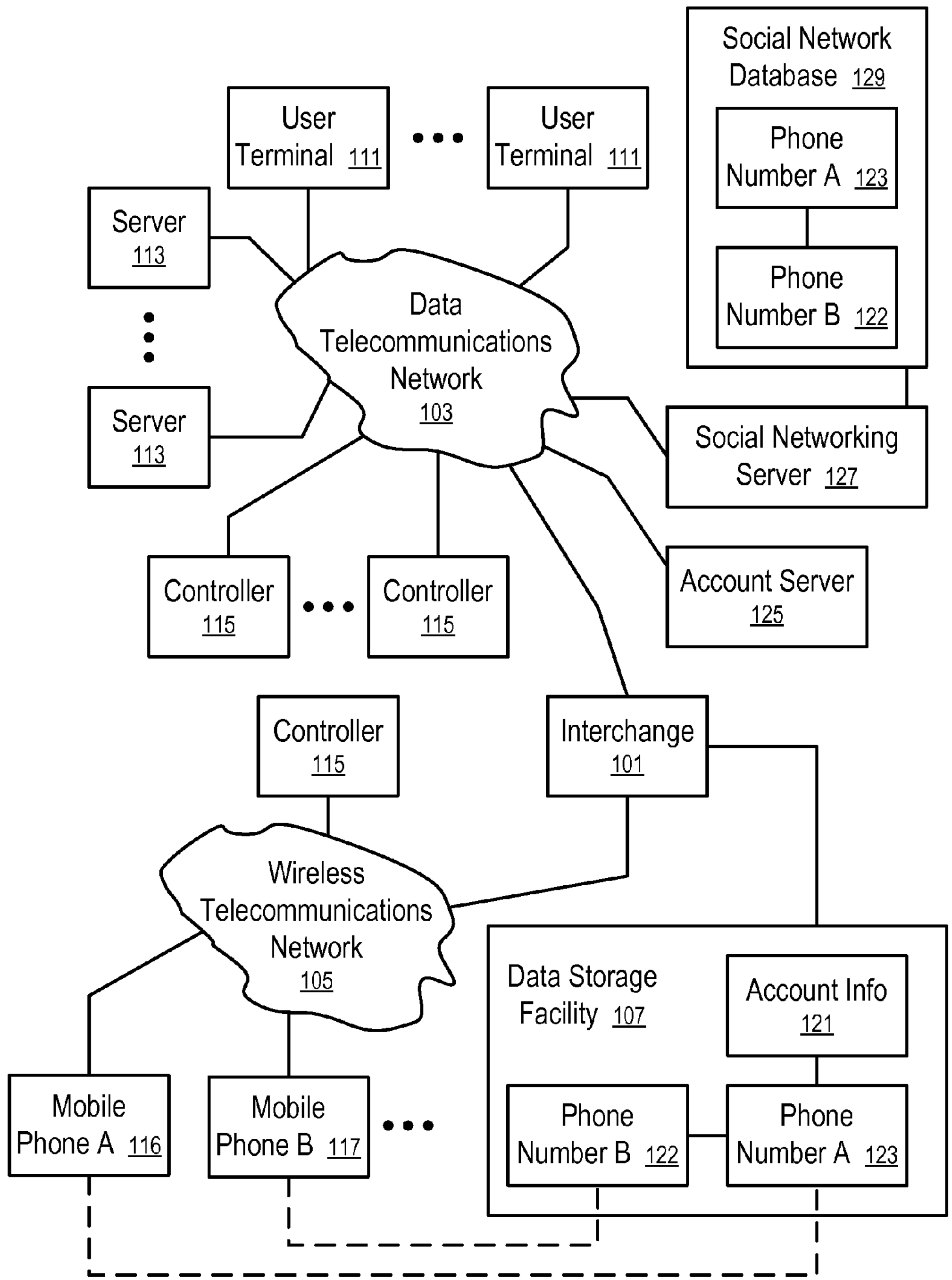
FIG. 1 shows a system to control online transactions according to one embodiment.

FIG. 1 shows a system to facilitate online transactions according to one embodiment. In FIG. 1, an interchange (101) is provided to interface with a plurality of different controllers (115) for communications with the mobile phones (e.g., 116, 117) over the wireless telecommunications network (105).

In FIG. 1, a data storage facility (107) stores user account information (121) and the corresponding phone number A (123) of the mobile phone A (116). The data storage facility (107) also stores data to associate the phone number B (122) with the phone number A (123). In FIG. 1, the mobile phone B (117) can be reached at the phone number B (122).

In one embodiment, different telecommunication carriers provide telecommunication services to the mobile phones (116 and 117). For example, the mobile phone A (116) may be with a first telecommunication carrier in a first country; and the mobile phone B (117) may be with a second telecommunication carrier in a second country different from the first country. In other embodiments, the same telecommunication carrier may provide telecommunication services to the mobile phones (116 and 117). In one embodiment, the controllers (115) are operated by the telecommunication carriers of the mobile phones (e.g., 116, 117, etc.)

FIG. 1 illustrates one group of mobile phones (116 and 117) that are associated with each other via the data in the data storage facility (107). However, a group may have more than two mobile phones; and the data storage facility (107) may store data to associate multiple groups of mobile phones.

In FIG. 1, the interchange (101) is coupled with the data storage facility (107) to communicate with the mobile phone B (117) at the corresponding phone number B (122) to confirm purchase requests and to communicate with the mobile phone A (116) at the corresponding phone number A (123) to approve the purchase request, which is to be funded by the account associated with the phone number A (123).

In one embodiment, the account information (121) includes the account numbers of financial accounts with banking systems, such as bank accounts, credit card accounts, debit card accounts, and others. Since the account information (121) is secured by the interchange (101), the account information (121) can be used to pay for products and services offered by the servers (113) of various merchants, without being revealed to the merchants.

In one embodiment, the server (113) offers products and/or services adapted for a virtual world environment, such as an online game environment, a virtual reality environment, etc. The products may be virtual goods, which can be delivered via the transmission of data or information (without having to physically deliver an object to the user). For example, the virtual goods may be a song, a piece of music, a video clip, an article, a computer program, a decorative item for an avatar, a piece of virtual land in a virtual world, a virtual object in a virtual reality world, etc. For example, an online game environment hosted on a server (113) may sell services and products via points or virtual currency, which may be consumed by the user while engaging in a game session. For example, a virtual reality world hosted on a server (113) may have a virtual currency, which may be used by the residents of the virtual reality world to conduct virtual commerce within the virtual reality world (e.g., buy virtual lands, virtual stocks, virtual objects, services provided in the virtual reality world, etc). In other embodiments, the server (113) may also offer physical goods, such as books, compact discs, photo prints, postcards, etc.

In some embodiments, the funds for the purchase requests are collected via the phone bill of the mobile phone A (116). For example, the interchange (101) may send a set of premium messages to the mobile phone A (116) to collect the funds via the premium messages. Alternatively, the interchange (101) may request the mobile phone A (116) to send a set of premium messages to the interchange (101) to provide the funds. Alternatively, the interchange (101) may communicate with the telecommunication carrier of the mobile phone A (116) to charge an amount on the monthly phone bill of the mobile phone A (116), or to deduct an amount from the prepaid amount of the mobile phone A (116).

In FIG. 1, the interchange (101) may communicate with different controllers (115) of mobile communications via different networks (e.g., 105 and 103) and/or protocols. The interchange (101) processes the requests in a common format and uses a set of converters for communications with the different controllers (115) respectively.

For example, the controllers (115) may be different aggregators, providers and/or SMSCs of different mobile carriers. Based on the phone number A (123), the interchange (101) interfaces with the corresponding controllers (115) to communicate with the mobile phone B (117) via text messaging to approve and fund the purchases confirmed by the associated mobile phone B (117). In some embodiments, the user of the mobile phone A (116) may also directly confirm, approve and fund the purchases.

In FIG. 1, the user terminals (111) may use a unified interface to send requests to the interchange (101). The user terminals (111) are typically different from the mobile phones. However, in some embodiments, users may use the mobile phone (116 or 117) to access the web and submit the account information (121).

For example, a website of the interchange (101) may be used to receive the account information (121) and/or the indication of the association between the phone numbers (122 and 123) from the web browsers running in the user terminals (111). Alternatively, the users may use the mobile phone (116 or 117) to submit the account information (121) to the interchange (101) via text messaging, email, instant messaging, etc.

Alternatively, the indication of the association between the phone numbers (122 and 123) may be received from the mobile phone (116 or 117), or from the telecommunication carrier of the mobile phone (116 or 117) (e.g., when the mobile phones share a phone bill).

The use of the mobile phones (116 and 117) in the confirmation and approval of activities that involve the account information (121) increases the security of the transaction, since the mobile phones (116 and 117) are typically secured in the possession of the users.

For the convenience of the users, the interchange (101) may use the phone bills of the mobile phones (116 and 117) to pay for purchases in one embodiment, use the account information (121) to pay for the phone bills, and/or deposit funds into the accounts identified by the account information (121) by charging on the phone bills of the corresponding mobile phones (116 and 117). In some embodiments, the accounts identified by the account information (121) are hosted on the data storage facility (107). In other embodiments, the accounts are hosted on the account servers (125) of financial institutions, such as banks, credit unions, credit card companies, etc.

In one embodiment, once the account information (121) is associated with the mobile phone A (116) via the phone number A (123) stored in the data storage facility (107) and the mobile phone B (117) is associated with the mobile phone A (116) via the association between the phone numbers (122 and 123) in the data storage facility (107), the user of the mobile phone B (117) may use the user terminal (111) to access online servers (113) of various merchants or service providers to make purchases and have the purchases funded by the user of the mobile phone A (116).

For example, the user of the mobile phone B (117) may confirm the purchase via the mobile phone B (117). Once the purchase request is confirmed via the mobile phone B (117), the user of the mobile phone A (116) may approve the purchase request via the mobile phone A (116). Once the purchase request is confirmed and approved, the interchange (101) may use the account information (121) to fund the purchase.

In one embodiment, when the user of the mobile phone A (116) approves the purchase, the user may choose to use the accounts identified by the account information (121) to provide the funds for the purchases, without revealing their account information (121) to the operators of the servers (113). Alternatively, the user may choose to provide the funds via the phone bill of the mobile phone A (116) (e.g., prepaid, or monthly bill).

For example, the user of the mobile phone B (117) may use the user terminal (111) to provide the phone number B (122) to the servers (113) and/or the interchange (101) to make a purchase. The interchange (101) sends a message to the mobile phone B (117) via the phone number B (122) to confirm the purchase request. Once the purchase is confirmed via the corresponding mobile phone B (117), the interchange (101) sends a message to the mobile phone A (116) based on the association of the phone numbers (122 and 123) in the data storage facility (107). Once the purchase is approved via the corresponding mobile phone A (116), the interchange (101) charges the account identified by the account information (121) (e.g., by communicating with the account server (125) on which the corresponding accounts are hosted) and pays the server (113) on behalf of the user, using the funds obtained from the corresponding account identified by the account information (121).

In one embodiment, the user terminal (111) does not have to provide the phone number B (122) to the server (113) to process the payment. The server (113) may redirect a payment request to the interchange (101), which then prompts the user terminal (111) to provide the phone number B (122) to the website of the interchange (101) to continue the payment process.

For example, the server (113) may redirect the payment request to the website of the interchange (101) with a reference indicating the purchase made via the user terminal (111). The interchange (101) can use the reference to subsequently complete the payment with the server (113) for the purchase, after receiving the phone number B (122) directly from the user terminal (111) to confirm the purchase via the mobile phone B (117).

In some embodiments, instead of directly providing the phone number B (122) to identify the account information (121), the user may provide other information to identify the phone number B (122), such as an account identifier of the user assigned to the user for obtaining the services of the interchange (101).

In one embodiment, the account information (121) is pre-associated with the phone number A (123) prior to the payment request. The account information (121) may be submitted to the interchange (101) via the user terminal (111) or the mobile phone A (116) via a secure connection.

Alternatively, the user of the mobile phone A (116) may supply the account information (121) to the interchange (101) at the time of approving the payment request, after the purchase is confirmed via the mobile phone B (117).

In one embodiment, once the account information (121) is associated with the phone number A (123) in the data storage facility (107), the user does not have to resubmit the account information (121) in subsequent payment requests. The user of the mobile phone A (116) may use a reference to the account information (121) to instruct the interchange (101) to use the account information (121) to collect the funds.

By delegating the payment task to the interchange (101) and securing the account information (121) in the data storage facility (107), the system as shown in FIG. 1 can increase the security of using the account information (121) in an online environment, while allowing the user of the mobile phone A (116) to control and pay for the purchases made by others, such as the user of the mobile phone B (117), without revealing the account information (121) to them.

In some embodiments, the interchange (101) can also fulfill the payment requests using the funds collected via the phone bill of the phone number A (123). The interchange (101) can collect the funds via sending premium messages to the mobile phone A (116) at the phone number A (123), after receiving confirmation from the mobile phone A (116).

For example, after the confirmation or approval message is received from the mobile phone A (116), the interchange (101) performs operations to collect funds via the phone bill of the phone number A (123). The interchange (101) may calculate the required premium messages to bill to the mobile phone A (116). For example, mobile terminated premium SMS messages may have a predetermined set of prices for premium messages. The interchange (101) determines a combination of the premium messages that has a price closest to the amount required for the purchase, and sends this combination of premium messages to the mobile phone A (116). For example, mobile originated premium SMS messages may also have a predetermined set of prices for premium messages. The interchange (101) can calculate the set of messages required for the purchase and transmit a text message to the mobile phone A (116) of the user to instruct the user to send the required number of premium messages to provide the funds.

In one embodiment, the user of the mobile phone A (116) can specify a set of restrictions that are applied to the purchase requests made by the users of the associated mobile phone B (117). For example, the restrictions may include the allowable frequency of the purchases, the allowable types of purchases (e.g., the type of products or services purchased), the allowable spending limit for each purchase, a budget for a predetermined period of time (e.g., a month, a week, etc.), the allowable time period during a day for purchases, etc. Thus, a parent may use the restrictions to apply parental control of the purchase activities of a child. In one embodiment, the interchange (101) communicates with the mobile phone B (117) for purchase confirmation, if the purchase satisfies the restrictions.

In one embodiment, the mobile phones (116 and 117) are used by the corresponding users to make payments and/or manage funds, such as for making purchases in various websites hosted on the servers (113) of merchants and service providers and/or for transfer funds to or from an account identified by the account information (121), such as phone bills of land-line phone services, credit card accounts, debit card accounts, bank accounts, etc., or an account hosted on the data storage facility (107) or telecommunication accounts of the mobile phones (116 and 117) with telecommunication carriers. The mobile phones (116 and 117) are used to confirm and/or approve the transactions associated with the account identified by the account information (121) (or other accounts). The interchange (101) interfaces the mobile phones (116 and 117) and the servers (113) to confirm and/or approve transactions and to operate on the account identified by the account information (121) (and/or other accounts associated with the phone numbers (122 and 123)).

In one embodiment, the user of the mobile phone A (116) may provide an advance approval for one or more anticipated purchases made by the users of the mobile phone B (117). For example, the mobile phones (116 and 117) may be in different countries in different time zones; and the user of the mobile phone A (116) may not be available to provide the approval when the user of the mobile phone B (117) makes a purchase. Thus, the user of the mobile phone A (116) may provide an advance approval with limitations, such as allowable amount/budget and expiration date, to avoid the delay in the approval of the purchases by the user of the mobile phone B (117).

In one embodiment, a user may use a social networking website, e.g., hosted on a social networking server (127), to initiate a request to make a purchase, to transfer funds to another user, or to transfer funds from an account to another account, etc.

In one embodiment, the social networking server (127) provides a service to allow users to form online communities of shared interests and/or activities. For example, the users may identify their friends among the users of the social networking website; and the social networking server (127) can identify the social networks of the users based on aggregating the friend relationships identified by the users and stored in the social network database (129) of the social networking server (127).

In one embodiment, the social networking server (127) allows the users to set up and customize profile pages. The profile pages can be used to describe interests and/or activities of the corresponding users, to express opinions, etc. The users may have access to settings to control who sees what, and block any unwanted member. The users may have blog pages or notes and individual picture albums to share information. The users may see the friends of friends and invite them to become friends. The users may also invite non-members of the social networking website to become members and friends in the social network.

In some embodiments, the social networking server (127) is accessible from a web browser running on a device, such as user terminals (111) and the mobile phones (116 and 117). In some embodiments, the social networking server (127) provides content to the mobile phones (116 and 117) via web pages, Wireless Application Protocol (WAP) applications, text messages (e.g., sent via short message service (SMS)), and/or multimedia messages (e.g., sent via multimedia messaging service (MMS)).

In one embodiment, after a user at the phone number A (123) signs into the social networking server (127) and requests a transaction with another user at the phone number B (122), the social networking server (127) identifies the phone numbers of the users based on the social network database (129) and provides the phone numbers (122 and 123) to the interchange (101) for the transaction. The interchange (101) then performs the transaction via the telecommunication carriers of the mobile phones (116 and 117) at the phone numbers (123 and 122) (e.g., via transmitting premium messages to the mobile phones), or using the account information (121) stored and associated with the phone number A (123) in the data storage facility (107) of the interchange (101) and/or the account information (not shown in FIG. 1) stored and associated with the phone number B (122) in the data storage facility (107) of the interchange (101).

For example, the user at the phone number A (123) may request the transferring of funds to, or from, the user at the phone number B (122). For example, the user at the phone number A (123) may purchase a virtual object from the user at the phone number B (122), such as a decorative item for an avatar, a virtual currency, points redeemable for playing a game, etc. For example, the user at the phone number A (123) may pay a fee to access contents provided by the user at the phone number B (122), such as an article, a photo image, a piece of music, a clip of video, etc. For example, the user at the phone number A (123) may purchase a physical object from the user at the phone number B (122).

In some embodiments, the interchange (101) may assist the social networking server (127) in building the social network database (129). For example, the transaction may include the user at the phone number A (123) requesting the user at the phone number B (122) to accept an invitation to form a friend relationship in the social network hosted on the social networking server (127). The interchange (101) transmits a message to the mobile phone B (117) at the phone number B (122) to ask the user at the mobile phone B (117) to confirm the establishment of the friend relationship with the user at the phone number A (123). When the user at the mobile phone B (117) accepts the invitation, the interchange (101) notifies the social networking server (127) about the confirmation of the friend relationship between the users at the phone numbers (122 and 123). The social networking server (127) then stores data in the social network database (129) to represent a direct connection between the user at the phone number A (123) and the user at the phone number B (122) in the social network.

In some embodiments, a user at the phone number (123) may purchase an item or service from a third party which may not be a member of the social networking website (e.g., via an advertisement presented on the social networking website). The social networking server (125) identifies the phone number (123) from the profile data of the user and provides the phone number (123) to the interchange (101) to process the payment. After the payment is processed, the interchange (101) notifies the social networking server (127) and/or the third party (e.g., when the third party is identified in the request received via the social networking server (127)).

Figure 2:
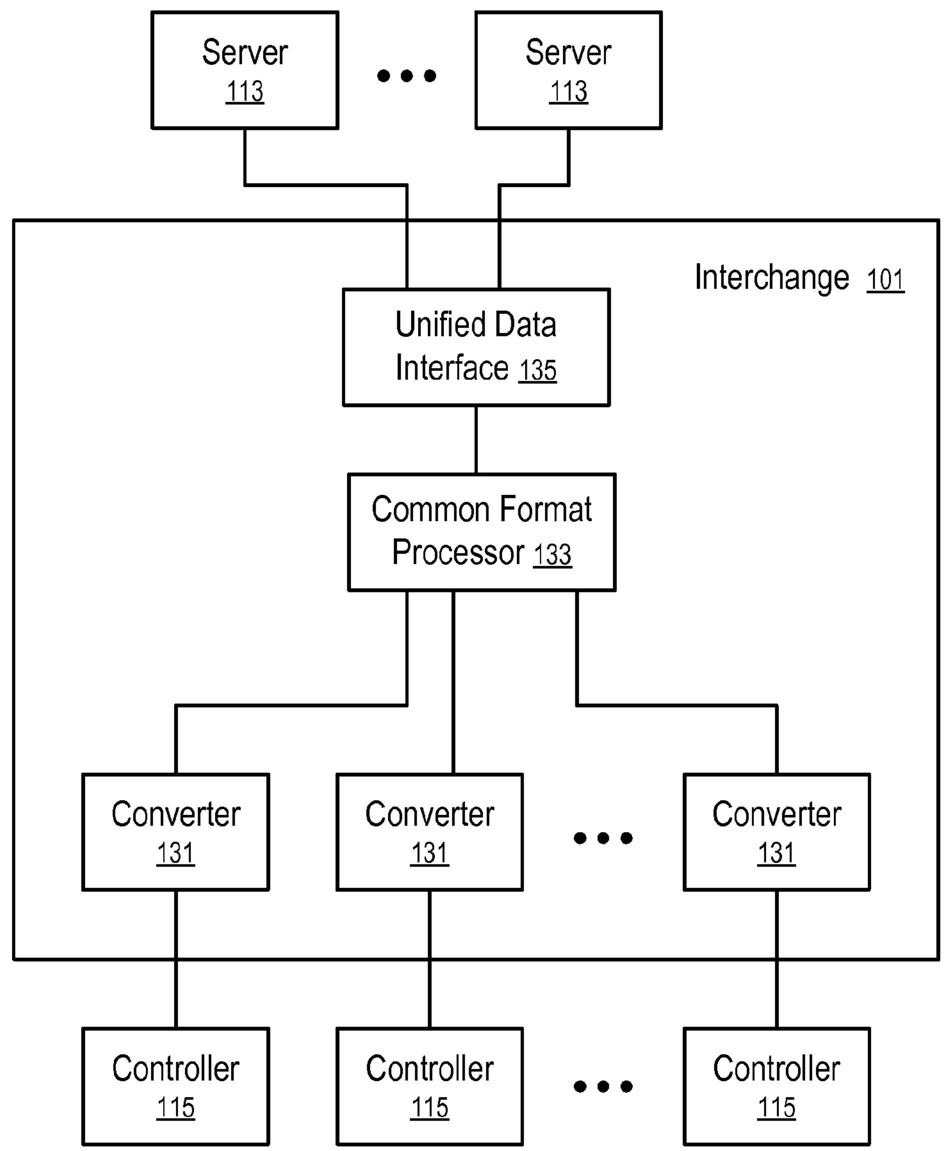
FIG. 2 shows an interchange to route messages according to one embodiment.

FIG. 2 shows an interchange to route messages according to one embodiment. In FIG. 2, the interchange (101) includes a unified data interface (135) for interaction with the servers (113). The servers (113) may redirect the payment requests to the interchange (101) to allow the interchange (101) to subsequently communicate with the user to process the payment request, including obtaining payment options and identifying user accounts, before returning to communicating with the server (113). Alternatively, the servers (113) may collect account related information (e.g., the phone number of the user) to request payment from the interchange (101).

In FIG. 2, the interchange (101) includes a common format processor (133), which processes various payment options in a common format. In one embodiment, the common format processor (133) can handle the payments via mobile terminated text message, mobile originated text message, operator bill, credit card, stored value account, and other online payment options. The common format processor (133) determines the actual amount that is to be billed to the user, based on the payment options (e.g., mobile terminated premium SMS, mobile originated premium SMS, operator billing, credit cards, etc.), and selects a converter (131) to communicate with a corresponding controller (115).

Different converters (131) are configured to communicate with corresponding controllers (115) in different languages and protocols. The converters (131) perform the translation between the common format used by the common format processor (133) and the corresponding formats used by the controllers (115).

The use of the common format processor (133) simplifies the structure of the interchange (101) and reduces the development effort required for the interchange (101) to interface with the increasing number of different controllers, such as SMSC, mobile providers, aggregators, gateways, etc.

Figure 3:
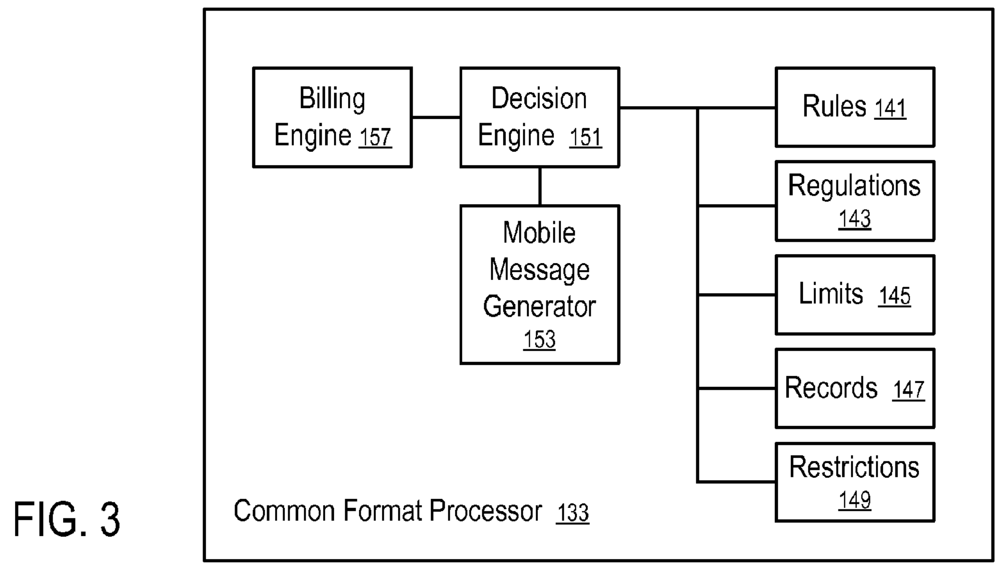
FIG. 3 shows a message processor according to one embodiment.

FIG. 3 shows a message processor according to one embodiment. In FIG. 3, the common format processor (133) includes a billing engine (157) that calculates the amount to be billed to the user, by adding or subtracting transaction costs for different billing methods, such as mobile terminated text message, mobile originated text message, operator billing, credit card, stored value account, and other online payment options.

In one premium message billing method, the interchange (101) sends mobile terminated premium SMS messages to the mobile phone (116) to bill the user, or requests the mobile phone (116) to send mobile originated premium SMS messages to a short code representing the interchange (101).

In one operator billing method, the interchange (101) directly sends a message to the mobile carrier of the mobile phone (116) to bill the amount on the phone bill of the mobile phone (116), without having to send a premium message to the mobile phone (116).

The common format processor (133) includes a decision engine (151) which decides how to generate a set of one or more messages to the mobile phone (117) based on a set of rules (141), regulations (143), limits (145), records (147) and restrictions (149).

For example, different countries have different regulations (143) governing the mobile communications with the mobile phones (e.g., 116, 117). For example, different mobile carriers have different rules (141) regarding premium messages. For example, past transaction records (147) can be used to monitor the transactions to discover suspected fraudulent activities. For example, parental limits (145) and merchant restrictions (149) can be imposed.

Based on results of the decision engine (151), the mobile message generator (153) generates one or more messages to communicate with the mobile phone (116) about the transaction (e.g., a request to collect funds via the phone bill of the user for a payment request, or for deposit into an account identified by the account information (121)). The converter (131) then interfaces with the corresponding controller (115) to transmit the messages to the mobile phone (116).

FIGS. 4-7 show methods to control an online transaction using an interchange according to a plurality of embodiments.

Figure 4:
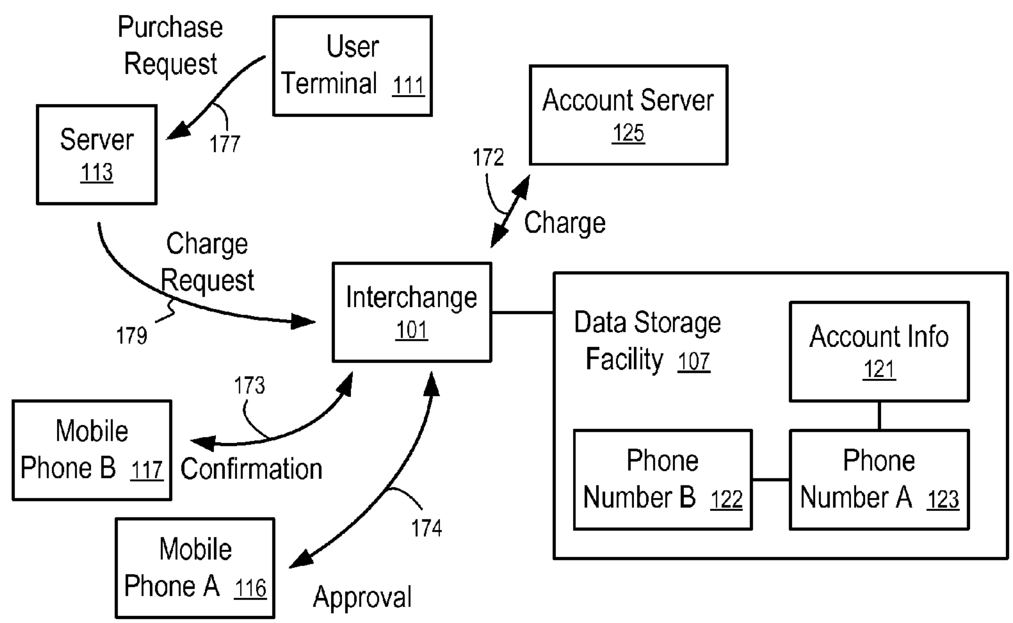
FIGS. 4-7 show methods to control an online transaction using an interchange according to a plurality of embodiments.

In FIG. 4, the user of the mobile phone (116) at the phone number (123) may provide account information (121) to the interchange (101) for association with the phone number (123). For example, the user may use a device running a web browser as the user terminal (111) to submit the account information (121) via a secure web connection. The user terminal (111) is typically different from the mobile phone (116). However, in some embodiments, the mobile phone (116) may also be used as the user terminal (111) to submit the account information (121) (e.g., via a wireless application protocol (WAP) application, or via a message sent via short message service (SMS) or multimedia message service (MMS), or via an email message or an instant message).

After the user of the mobile phone A (116) provides the account information (121) to the interchange (101) for storage in the data storage facility (107), the user of the associated mobile phone B (117) can send (177) a purchase request to the server (113) of a merchant from the user terminal (111). The users of the mobile phones (116 and 117) may use the same user terminal (111) or different user terminals.

In response to a purchase request from the user terminal (111), the server (113) of the merchant can send or redirect (179) the charge request to the interchange (101). In response to the charge request, the interchange (101) sends (173) a confirmation message to the mobile phone B (117). If the user of the mobile phone B (117) sends (173) a confirmation to the interchange (101), the interchange (101) sends (174) a message to the mobile phone A (116) for approval, since the data stored in the data storage facility (107) indicates that the purchases made by the user of the mobile phone B (117) at the phone number B (122) are to be funded by the user of the mobile phone A (116) at the phone number A (123). If the user of the mobile phone A (116) approves the request, the interchange (101) communicates with the account server (125) to charge (172) an account identified by the account information (121), without revealing the account information (121) to the server (113). The interchange (101) pays the merchant on behalf of the user using the funds collected via charging the account of the user of the mobile phone A (116). For example, the interchange (101) may use its own bank account to pay the merchant operating the server (113). Thus, the financial information of the user is not revealed to the merchant.

Upon the completion of the payment process, the interchange (101) can notify the mobile phone B (117), the mobile phone A (116) and/or the user terminal (111).

In some embodiments, the server (113) of the merchant redirects the charge request to allow the user terminal (111) to communicate with the interchange (101) to continue the payment process; and the user terminal (111) may provide (171) the phone number (122), or both the phone numbers (122 and 123), directly to the interchange (101) to request the interchange (101) to process the payment for the transaction, after the charge request is redirected.

In alternative embodiments, the user of the mobile phone A (116) may provide the account information (121) from the mobile phone A (116) together with the approval of the purchase request.

In one embodiment, the interchange (101) communicates with the mobile phone B (117) for the confirmation of the charge request via SMS messages. Alternatively, the confirmation communications can be sent (173) via emails, instant messages, voice message, live calls from operators, etc.

In one embodiment, the interchange (101) communicates with the mobile phone A (116) for the approval of the charge request via SMS messages. Alternatively, the approval communications can be sent (173) via emails, instant messages, voice message, live calls from operators, etc.

In some embodiments, the confirmation communications may include only a one-way message from the interchange (101) to the mobile phone B (117) or from the mobile B phone (117) to the interchange (101). For example, the interchange (101) may provide a code (e.g., a one time code with an expiration time limit) to the mobile phone B (117) and the user may be required to provide the code back to the interchange (101) via the user terminal (111) to confirm the request. For example, the interchange (101) may provide the code to the user terminal (111) to request the code back from the mobile phone B (117) to confirm the request.

Similarly, the approval communications may include only a one-way message from the interchange (101) to the mobile phone A (116) or from the mobile phone A (116) to the interchange (101). For example, the interchange (101) may provide a code (e.g., a one time code with an expiration time limit) to the mobile phone A (116) and the user may be required to provide the code back to the interchange (101) via the user terminal (111) to confirm the request. For example, the interchange (101) may provide the code to the user terminal (111) to request the code back from the mobile phone A (116) to confirm the request.

In some embodiments, the interchange (101) may provide the code representing the transaction to the mobile phone B (117) and request the code back from the mobile phone (116) to confirm and approve the transaction. In some embodiments, the interchange (101) may provide the code representing the transaction to the mobile phone A (116) and request the code back from the mobile phone B (117) to confirm and approve the transaction. The users of the mobile phones (117 and 116) may communicate with each other via any communication links to allow the code be reported back to the interchange (101). For example, the users of the mobile phones (116 and 117) may forward the code via SMS, emails, instant messages, voice message, or live calls, etc.

Figure 5:
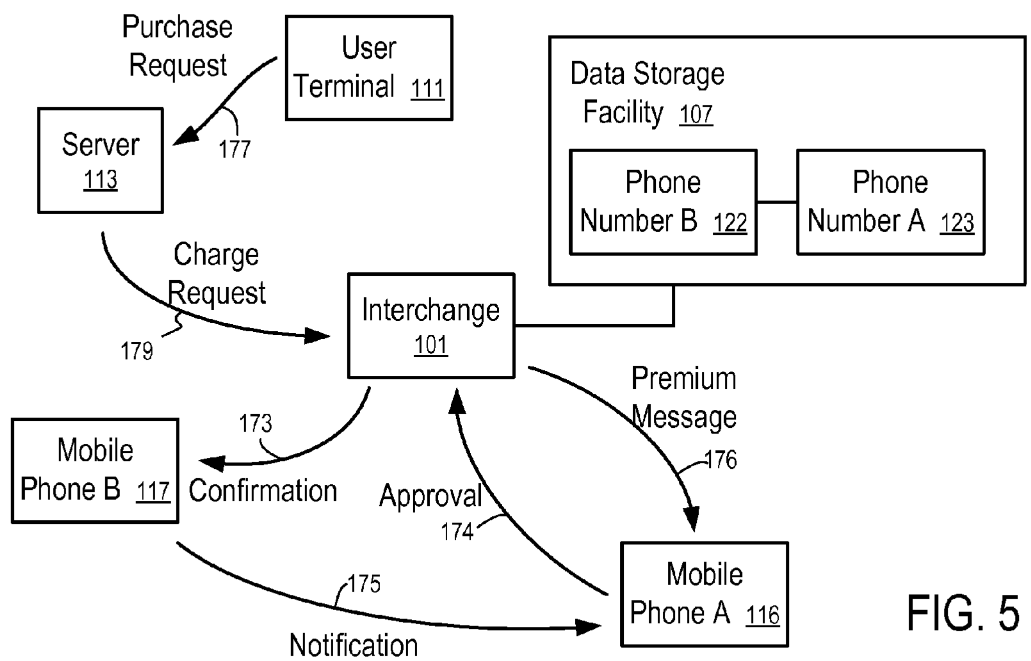

In some embodiments, the user of the mobile phone B (117) may choose to fulfill the charge request via the phone bill, instead of charging the account identified by the account information (121), as illustrated in FIG. 5.

In FIG. 5, after the interchange (101) sends (173) a confirmation code to the mobile phone B (117), the user of the mobile phone B (117) provides (175) the code to the mobile phone A (116) via a notification message (e.g., via SMS, emails, instant messages, voice message, live calls, etc.). The user of the mobile phone A (116) then provides (174) the confirmation code to the interchange (101) to approve the transaction.

In FIG. 5, after receiving the approval from the mobile phone A (116), the interchange (101) sends (176) a set of premium messages to the mobile phone A (116) to collect funds via the telecommunications carrier of the mobile phone A (116).

Figure 6:
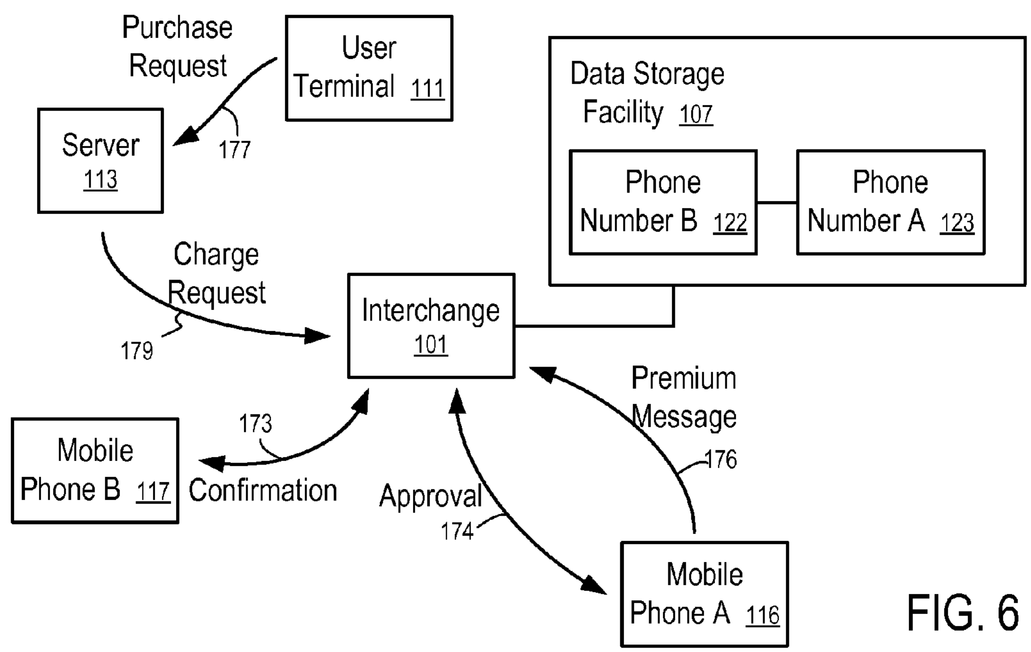

Alternatively, the interchange (101) may request the mobile phone A (116) to send (176) a set of premium messages from the mobile phone (176) to collect the funds for the purchase request, as illustrated in FIG. 6. In some embodiments, the set of premium messages includes the approval message sent from the mobile phone A (116) to the interchange (101). In FIG. 6, the interchange (101) separately communicates with the mobile phone B (117) of the purchaser and the mobile phone A (116) of the approver/payer for confirmation and for approval.

In some embodiments, the interchange (101) obtains the approval from the mobile phone A (116) of the approver/payer prior to obtaining confirmation from the mobile phone B (117) of the purchaser. In some embodiments, the interchange (101) obtains the confirmation from the mobile phone B (117) of the purchaser prior to obtaining the approval from the mobile phone A (116) of the approver/payer. In other embodiments, the interchange (101) sends (173 and 174) messages to both the mobile phones (116 and 117) prior to receiving replies from any of the mobile phones (116 and 117).

Figure 7:
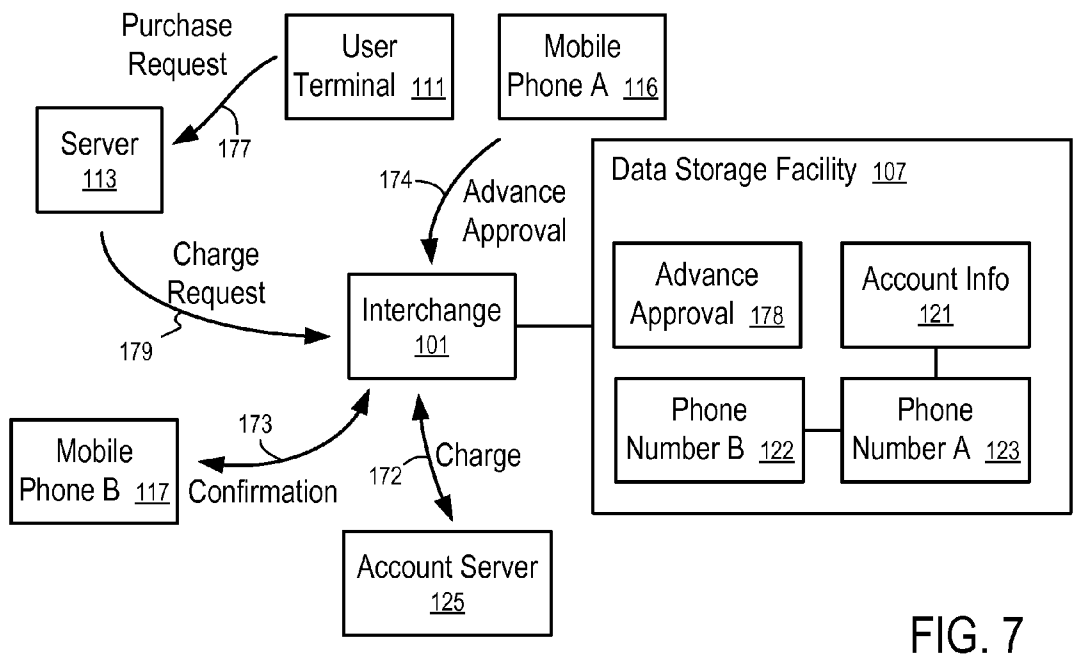

FIG. 7 illustrates an example of an advanced approval from the mobile phone A (116) of the approver/payer. After the mobile phone A (116) sends (174) an advance approval to the interchange (101), the data storage facility (107) stores data indicating the advance approval (178), which may include a budget limit, an expiration date, and a reference to the phone number B (122) associated with the phone number A (123) of the mobile phone A (116). When the charge request (179) is received (179) from the server (113) of the merchant (or from the user terminal (111)), the interchange (101) communicates (173) with the mobile phone B (117) to confirm the request, if the request meets the limitations of the advance approval (178).

FIGS. 8-11 show interfaces to obtain information of related phone numbers according to a plurality of embodiments.

Figure 8:
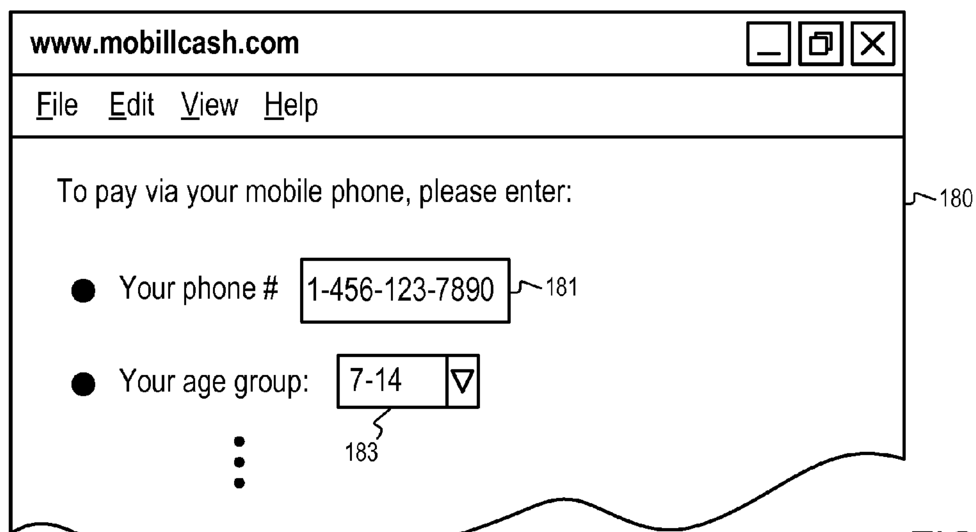
FIGS. 8-11 show interfaces to obtain information of related phone numbers according to a plurality of embodiments.
Figure 9:
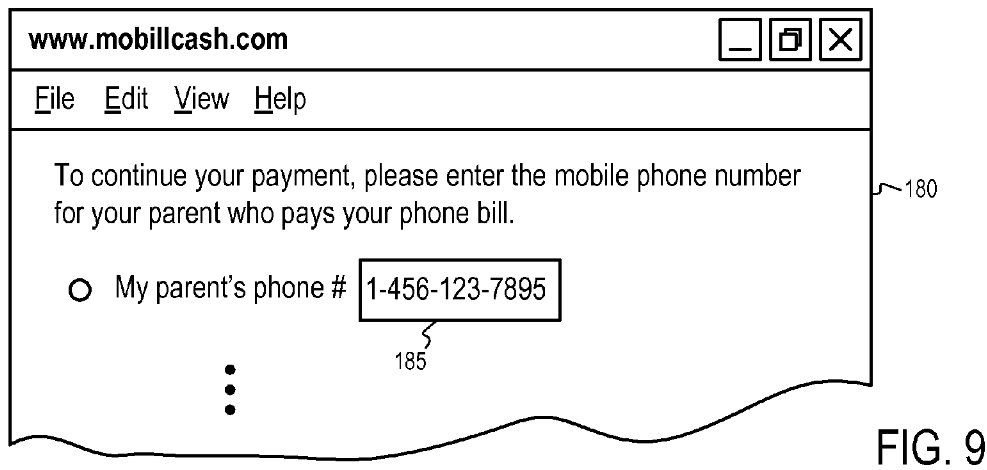

In FIG. 8, the user interface (180) (e.g., presented on the user terminal (111) or the mobile phone B (117)) prompts the user to provide the phone number B (122) in the input box (181) and to provide an indication of the age of the user in the selection box (183). If it is determined that the user is a child under an age limit, the user interface illustrated in FIG. 9 is presented to require the user to provide the phone number A (123) of the parent in the entry box (185). Once the child user provides the phone number A (123) of the parent, the data storage facility (107) stores data to associate the phone number B (122) of the child with the phone number A (123) of the parent and an indication that the funds for the purchases made by the child come from the parent at the phone number A (123).

In one embodiment, the server (113) presents the user interface (180) via an online shopping cart system or a third party checkout system. Alternatively or in combination, the server (113) presents the user interface (180) via a web widget. For example, a web widget may include a program code that is portable and executable within a web page without requiring additional compilation. The web widget allows the user to interact with the user interface (180) to pay for the product and/or service without leaving the web page or refreshing the web page. In one embodiment, the interchange (101) provides the web widget to facilitate the payment processing.

Figure 10:
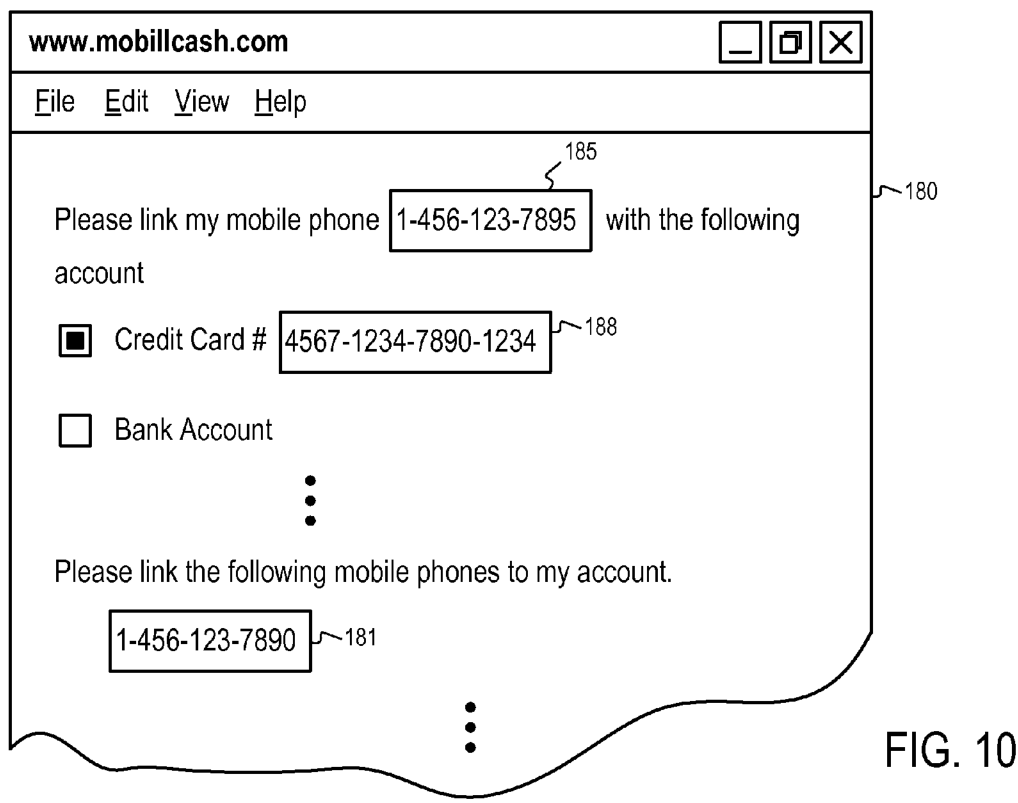

In FIG. 10, when the user of the mobile phone A (116) provides the phone number (123) in the entry box (185) to associate the phone number A (123) with the account information (121) provided within the entry box (188), the user interface (180) allows the user to link the phone number (123) with one or more phone numbers specified in the input box (181). If the user links the phone numbers (122 and 123) via the user interface (180) illustrated in FIG. 9, the data storage facility (107) allows the user of the mobile phone B (117) at the phone number B (122) to fund purchases using the account information (121) provided via the entry box (188). The interchange (101) is then configured to communicate with the mobile phone A (116) at the phone number A (123) provided in the entry box (185) for approval of the purchases made by the user of the associated mobile phone B (117).

FIG. 10 illustrates the example of specifying a credit card number in the entry box (188) as the account information (121). Alternatively or in combination, the user interface (180) may allow the user to specify one or more of various other types of accounts, such as bank accounts, charge card accounts, etc.

In some embodiments, the user interface (180) may further present a text field (not shown in FIG. 10) to allow the user to specify an alias for the account information (121) supplied in the text input field (181). For enhanced security, the alias can be used for subsequent communications with the user to select one account from a plurality of accounts without revealing the account information (121).

In FIG. 10, the user interface (180) may be presented via a web browser (or a custom application) to submit account information (121) from a user terminal (111) to the interchange (101). Alternatively, the account number can be submitted from the mobile phone (116) via a message sent via SMS, WAP, voice mail, or via an interactive voice response (IVR) system.

Figure 11:
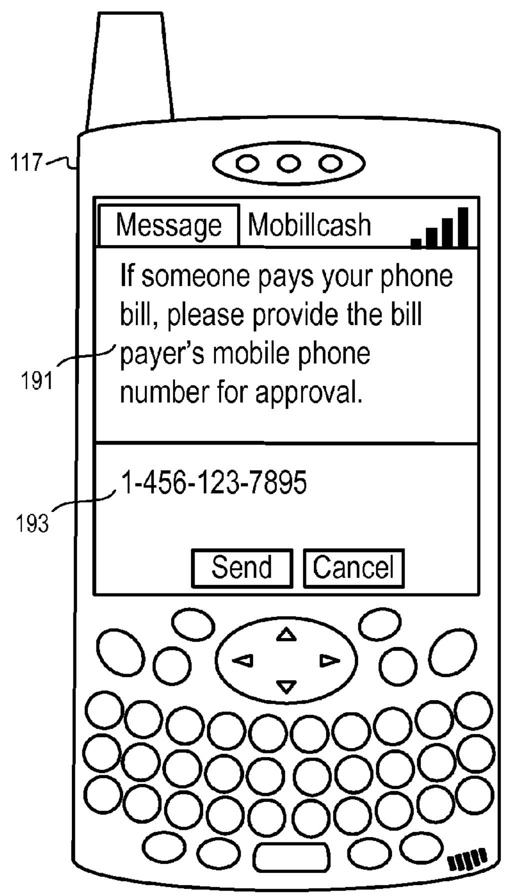

FIG. 11 illustrates the mobile phone B (117) of a child prompting the child to provide a phone number of the parent of the child. For example, after the child initiates a purchase request with the phone number B (122) of the mobile phone B (117) operated by the child, the interchange (101) may prompt the child to provide the phone number A (123) of the parent (191). After the child provides the phone number A (123;193) of the parent, the interchange (101) can communicate with the mobile phone A (116) of the parent for approval and billing.

In some embodiments, the mobile phone B (117) of the child is used to prompt for the phone number of the parent, when the child registers with the interchange (101). The interchange (101) provides the message to the mobile phone B (117) to confirm that the user is in possession of the mobile phone B (117) at the phone number B (122) and to prompt the user for the phone number of the person who pays the phone bill of the mobile phone B (117).

In some embodiments, a user of the mobile phone B (117) may also request the interchange (101) to link the phone number B (122) with the phone number A (123) of a family member, a relative, or a friend who is willing to fund some purchases made by the user. Thus, the relationship between the users of the mobile phones (116 and 117) is not limited to the child and parent relationship.

Figure 12:
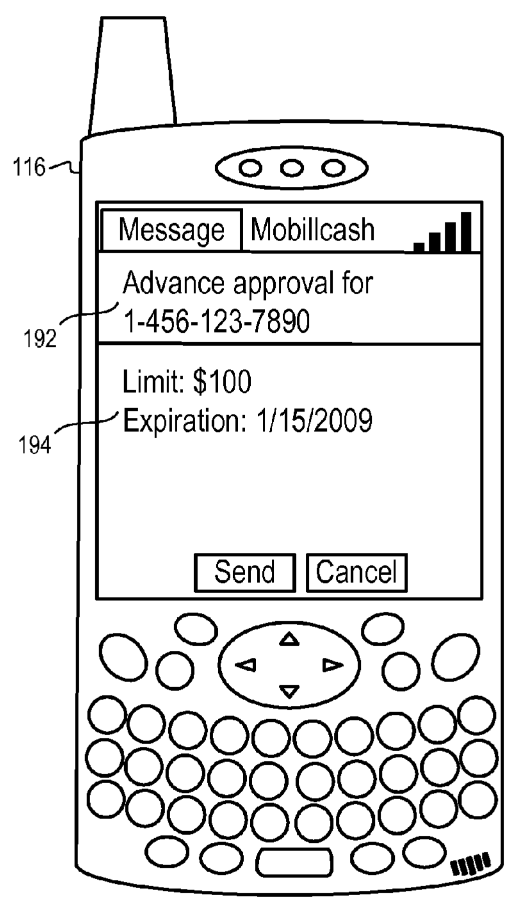
FIG. 12 illustrates a user interface to provide advance approval according to one embodiment.

FIG. 12 illustrates a user interface to provide advance approval according to one embodiment. In FIG. 12, the user of the mobile phone A (116) provides a message (194) to approve one or more future purchases requests initiated by the user of the mobile phone B (117).

In one embodiment, the advance approval is in response to a request from the mobile phone B (117). The interchange (101) sends a message (192) to the mobile phone A (116), in response to the request for advance approval from the mobile phone B (117). The message (192) identifies the phone number B (122) of the mobile phone B (117); and the advance approval message (194) includes restrictions, such as a budget limit, an expiration limit of the advance approval, etc. Other restrictions may include the location and time of the purchase, the type of products and services to be purchased, the maximum number of purchase requests, the frequency of purchase requests, etc.

In some embodiments, the user of the mobile phone A (116) at the phone number A (123) may directly send a message to interchange (101) provide the advance approval for the phone number B (122), without a corresponding incoming message from the interchange (101). For example, the users of the mobile phones (116 and 117) may communicate with each other to identify the need for the advance approval, prior to the user of the mobile phone A (116) sending the advance approval to the interchange (101).

Figure 13:
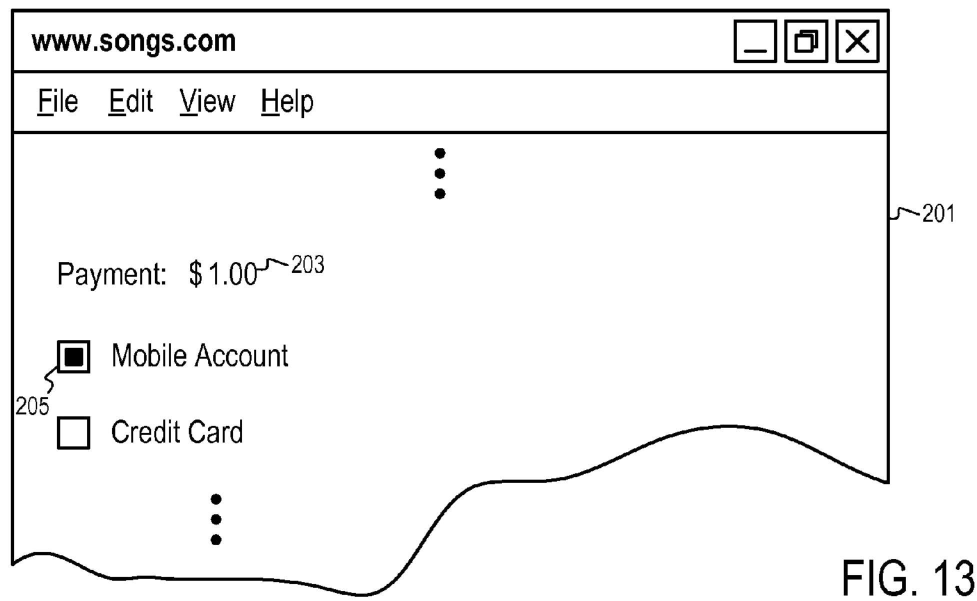
FIG. 13 illustrates a user interface to initiate a payment transaction according to one embodiment.

FIG. 13 illustrates a user interface to initiate a payment transaction according to one embodiment. In FIG. 13, the user interface (201) provides an option (205) to request the interchange (101) to process the payment for the amount (203) required to make a purchase from the server (113) of a merchant.

In one embodiment, after the user selects the payment option (205), the server (113) directs the request to the web server of the interchange (101), with a set of parameters to indicate the amount (203), the identity of the merchant, a reference to the purchase, etc. Thus, the user does not have to provide any personal information to the server (113) of the merchant to complete the payment process.

Alternatively, the user may provide the phone number to the merchant to process the payment. Thus, the user does not have to visit the website of the interchange (101) to complete the payment.

Figure 14:
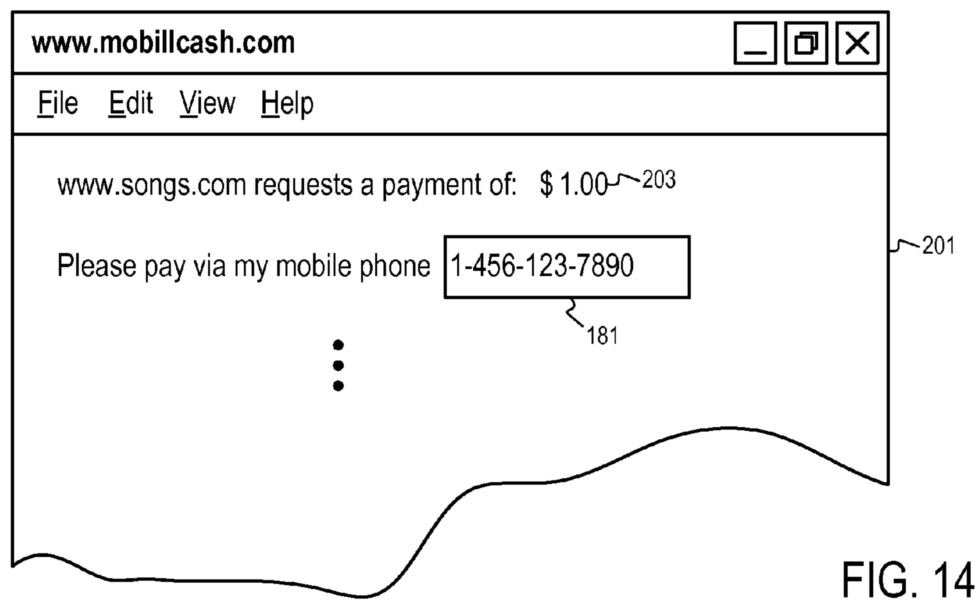
FIG. 14 illustrates a user interface to initiate a payment request according to one embodiment.

FIG. 14 illustrates a user interface to initiate a payment request according to one embodiment, after the payment request is redirected to the website of the interchange (101). In FIG. 14, the user interface (201) includes the identity of the merchant and the amount (203) of the requested payment. The user interface (201) includes a text field (181) to allow the user to provide the phone number B (122) of the mobile phone B (117) to confirm the purchase request.

Further, user authentication may be used to reduce false messages to the phone number (122). For example, the user interface (201) may request a personal identification number (PIN) for enhanced security. For example, the user may be required to register with the interchange (101) prior to using the services of the interchange (101); and after registering with the interchange (101), the user is provided with the PIN or can created a customized PIN to access the functionality provided by the user interface (201).

Alternatively, the user interface (201) may request an identifier associated with the phone number B (122) to initiate the payment transaction. In some embodiments, the user interface (201) requires the user to provide no information other than the phone number B (122) in the text field (181) to initiate the transaction. In some embodiments, the user interface (201) provides a list of options for the user at the phone number B (122) to fund the purchases, such as credit cards or bank accounts associated with the phone number B (122), or accounts associated with the phone number A (123).

In some embodiments, the user interface (201) may present the payment options after authenticating the user (e.g., via a personal identification number or password) for enhanced security.

In one embodiment, once the user submits the payment request via the user interface (201), the interchange (101) transmits a confirmation message to the mobile phone B (117) according to the phone number B (122) provided in the text field (181). In one embodiment, the interchange (101) transmits the confirmation to the mobile phone A (116) after the user is authenticated via the user interface (201) to reduce the possibility of unauthorized/unwelcome messages to the mobile phone A (116), which may occur when the user intentionally or unintentionally provides an unrelated phone number in the entry box (181).

Figure 15:
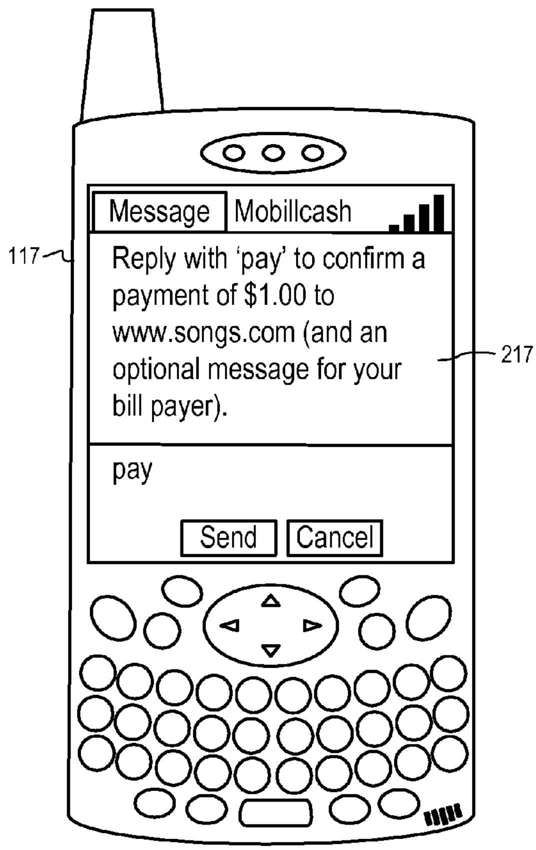
FIG. 15 illustrates a user interface to confirm a payment request according to one embodiment.

FIG. 15 illustrates a user interface to confirm a payment request according to one embodiment. In FIG. 15, the confirmation message (217) from the interchange (101) includes the amount (203) of the requested payment and the identity of the payee (e.g., a merchant operating the server (113)).

In one embodiment, the confirmation message (217) includes the instruction to reply with a code, such as a code (e.g., "pay") provided in the confirmation message (217) as illustrated in FIG. 15.

The presence of the code in the reply message is an indication of the user approving the request; and the requirement for such a code in the reply eliminates false confirmations (e.g., generated via accidental replies or automated replies).

Alternatively or in combination, the requested code may include a PIN associated with the phone number B (122), and/or a code (not shown) randomly generated and presented in the user interface used to initiate the payment transaction (e.g., user interface (201)).

In some embodiments, the code requested in the text message (217) may be a personal identification number (PIN) associated with the phone number A (123). The text message (217) does not include the code; and the knowledge of the code is an indication of the identity of the user. Thus, the use of such a code increases the security of the transaction.

In a further embodiment, the code requested in the text message (217) includes a code that is provided in response to the payment request (e.g., via the user interface (201), not shown in FIG. 14). The code may be generated randomly at the time the request is received via the user interface (201), or when the user interface (201) is presented to the user. The code provided to the user interface (201) can be requested in the reply received from the user interface (190) to indicate that the user who is in possession of the mobile phone B (117) has actual knowledge about the payment request submitted via the user interface (201).

In one embodiment, the user of the mobile phone B (117) may optionally provide a message with the code to the interchange (101). The interchange (101) then relays the message to the mobile phone A (116) to assist the approval decision making at the mobile phone A (116).

Figure 16:
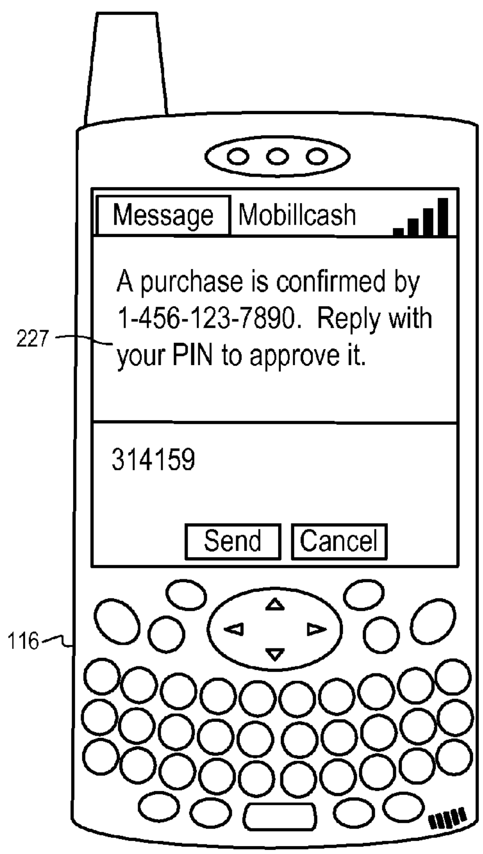
FIG. 16 illustrates a user interface to approve a confirmed payment request according to one embodiment.

FIG. 16 illustrates a user interface to approve a confirmed payment request according to one embodiment. In one embodiment, the interchange (101) sends a message (227) to the mobile phone A (116) at the phone number A (123), based on the association relationship between the phone numbers (122 and 123). The message (227) requests approval of a purchase made by the user of the mobile phone B (117). The interchange (101) confirms the identity of the purchaser via the communications with the mobile phone B (117), as illustrated in FIG. 15.

In FIG. 16, the approval request message (227) requests a code, such as a PIN associated with the phone number A (123). Alternatively or in combination, the approval request (227) may include a code provided in the message (227) and/or the code provided to the user of the mobile phone B (117) for the purchase transaction.

In FIG. 16, the user provides the PIN using the mobile phone A (116) to approve the purchase. Alternatively, the user may provide the PIN on a web site of the interchange (101) to approve the purchase. For example, the user may log in a web site of the interchange (101) by identifying the phone number A (123) to the interchange (101) to see a list of pending requests to be approved by the user.

In one embodiment, if the user of the mobile phone B (117) provides the optional message in the confirmation reply to the interchange (101), the approval request message (227) also includes a copy of the optional message to assist the user of the mobile phone A (116) in deciding whether or not to approve the purchase.

In some embodiments, the user of the mobile phone A (116) may optionally provide the account information (121) to provide the funds for the purchase.

In one embodiment, after the purchase is confirmed and approved via the communications with the mobile phones (117 and 116), the interchange (101) communicates with the account server (125) to electronically charge the user of the mobile phone A (116) using the associated account information (121) and pays the payee using the funds collected via communicating with the account server (125). Alternatively, the interchange (101) may send premium messages to the mobile phone A (116) to collect the funds via the telecommunication carrier of the mobile phone A (116), request premium messages from the mobile phone A (116), or communicate with the telecommunication carrier of the mobile phone A (116) to collect the funds via the phone bill of the mobile phone A (116).

In some embodiments, the interchange (101) notifies the users when the payment transaction is complete.

For example, the interchange (101) may notify the user of the mobile phone B (117) and/or the user of the mobile phone A (116) via a text message. Once the payment transaction is complete, the user would have access to the product purchased via the payment transaction.

In one embodiment, the interchange (101) stores an address of the user associated with the phone number B (122). After the completion of the payment transaction, the interchange (101) provides the address to the server (113) of the merchant for the delivery of the purchased product. In some embodiments, the user of the mobile phone B (117) may provide multiple addresses associated with the phone number B (122) and may select one as a delivery address in the confirmation message to the interchange (101). Alternatively, the interchange (101) may receive an address for product delivery from the mobile phone B (117) together with the confirmation message and then forward the address to the server (113) of the merchant. Thus, the shipping address of the transaction is verified to be associated with the mobile phone B (117). In alternative embodiment, the user may directly provide the shipping address in the website hosted on the server (113) of the merchant.

In some embodiments, the user is provided with the options to pay via the mobile phone bill associated with the phone number A (123). The interchange (101) may dynamically calculate a set of premium messages, based on a set of limited number of predetermined prices for premium messages, to match the purchase price. The interchange (101) sends the set of premium messages to the mobile phone A (116) at the phone number A (123) to collect the funds via the telecommunication carriers to pay for the purchases. Thus, the purchase prices are not limited to the set of predetermined prices for premium messages. In some embodiments, the interchange (101) may send the set of premium messages in a period of time (e.g., a week, a month, a number of mouths, etc.) to spread the payments over the period of time (e.g., to overcome budget limits and/or limits imposed by regulations).

Figure 17:
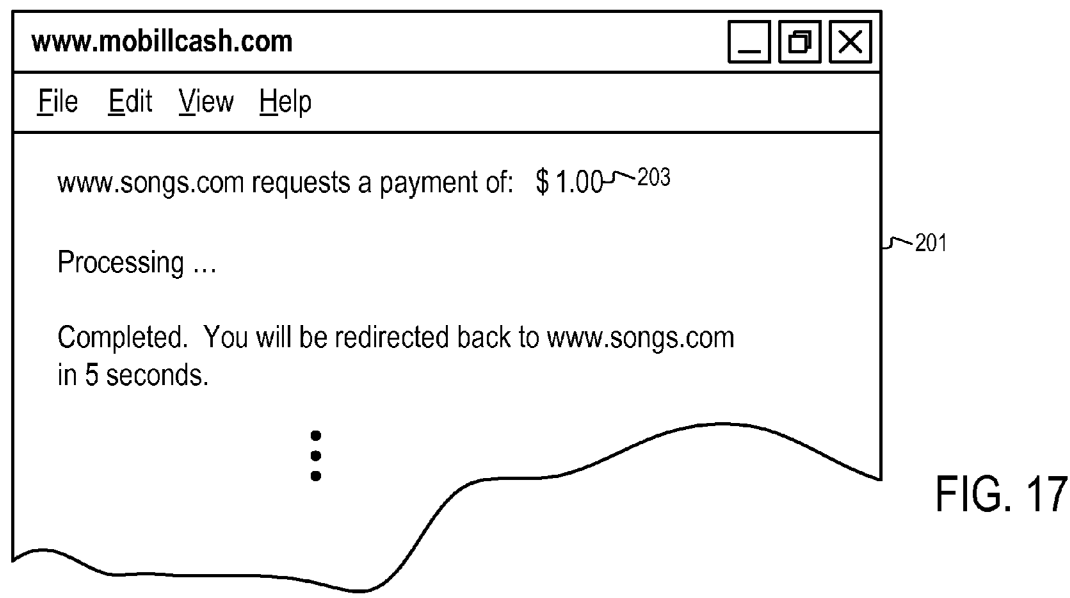
FIG. 17 illustrates a way to redirect a payment confirmation according to one embodiment.

FIG. 17 illustrates a way to redirect a payment confirmation according to one embodiment. For example, after the user submits the payment request to the interchange (101) via the user interface (201) shown in FIG. 14 (or FIG. 9), the interchange (101) may present the user interface (201) illustrated in FIG. 17 to the user. The user interface (201) indicates that the request is being processed; and the user interface (201) is periodically updated to show progress. Once the payment transaction is completed, the user interface (201) provides a confirmation message and may automatically redirect the user back to the website of the payee (e.g., to access the purchased products or services).

In one embodiment, the confirmation and approval from the users are required within a predetermined period of time of the request. If the user fails to provide the confirmation from the mobile phone B (117), or the approval from the mobile phone A (116), within the predetermined period of time, the payment request may be rejected; and the user interface (201) may present a message indicating the failure and then redirect the user back to the website of the payee.

In some embodiments, instead of redirecting the user back to the website of the payee after the expiration of a predetermined period of time (e.g., after the failure of the payment process, or after the completion of the payment), the user interface (201) may provide a link to the website of the payee to allow the user to manually select the link to go back to the website of the payee to continue the process at the website of the payee.

Figure 18:
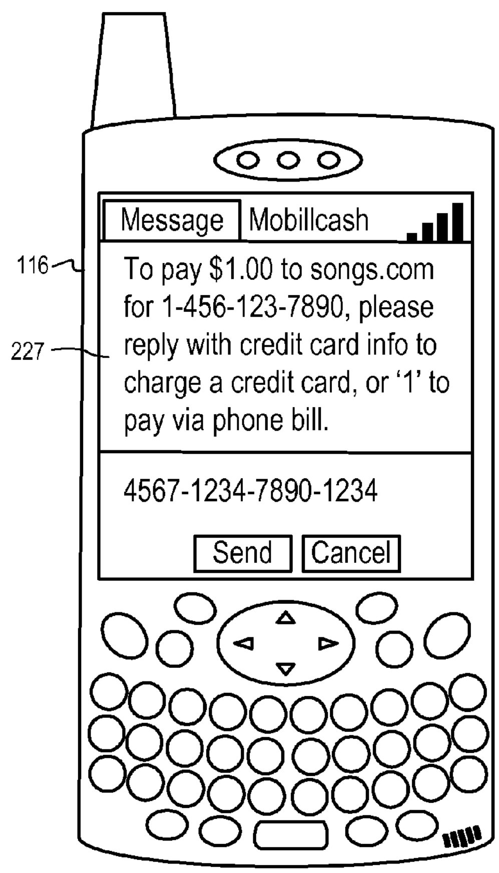
FIG. 18 illustrates a user interface to receive payment options according to one embodiment.

FIG. 18 illustrates a user interface to receive payment options according to one embodiment. In FIG. 18, the interchange (101) sends a message (227) to the mobile device (116) to provide a number of options to the user. The message (227) identifies the amount (203) of the requested payment and the identity of the payee (e.g., a merchant operating the server (113)) and asks the user to approve the payment request via a reply that contains a selected payment option.

In FIG. 18, the user may reply with the code "1" to approve the payment request and to pay via the phone bill of the mobile device (116). Alternatively, the user may reply with the credit card information to charge the payment to a credit card, as illustrated in FIG. 18.

In one embodiment, if the user provides credit card account information in the approval message, the credit card account information is stored and associated with the phone number (123) in the data storage facility (107). Thus, in subsequent approval messages, the user does not have to supply the same information again.

For example, the data storage facility (107) may store account information for each of a plurality of account types (e.g., Visa, MasterCard, checking, savings, etc.). Thus, each of the accounts can be identified to the user via the account type in the confirmation message, without revealing the details of the account information.

For example, the interchange (101) may combine the name of the financial institutions and the type of accounts to generate aliases for the account information.

In some embodiments, the user may define the aliases for the account information by supplying the aliases with the account information (121) for association with the phone number (123).

Figure 19:
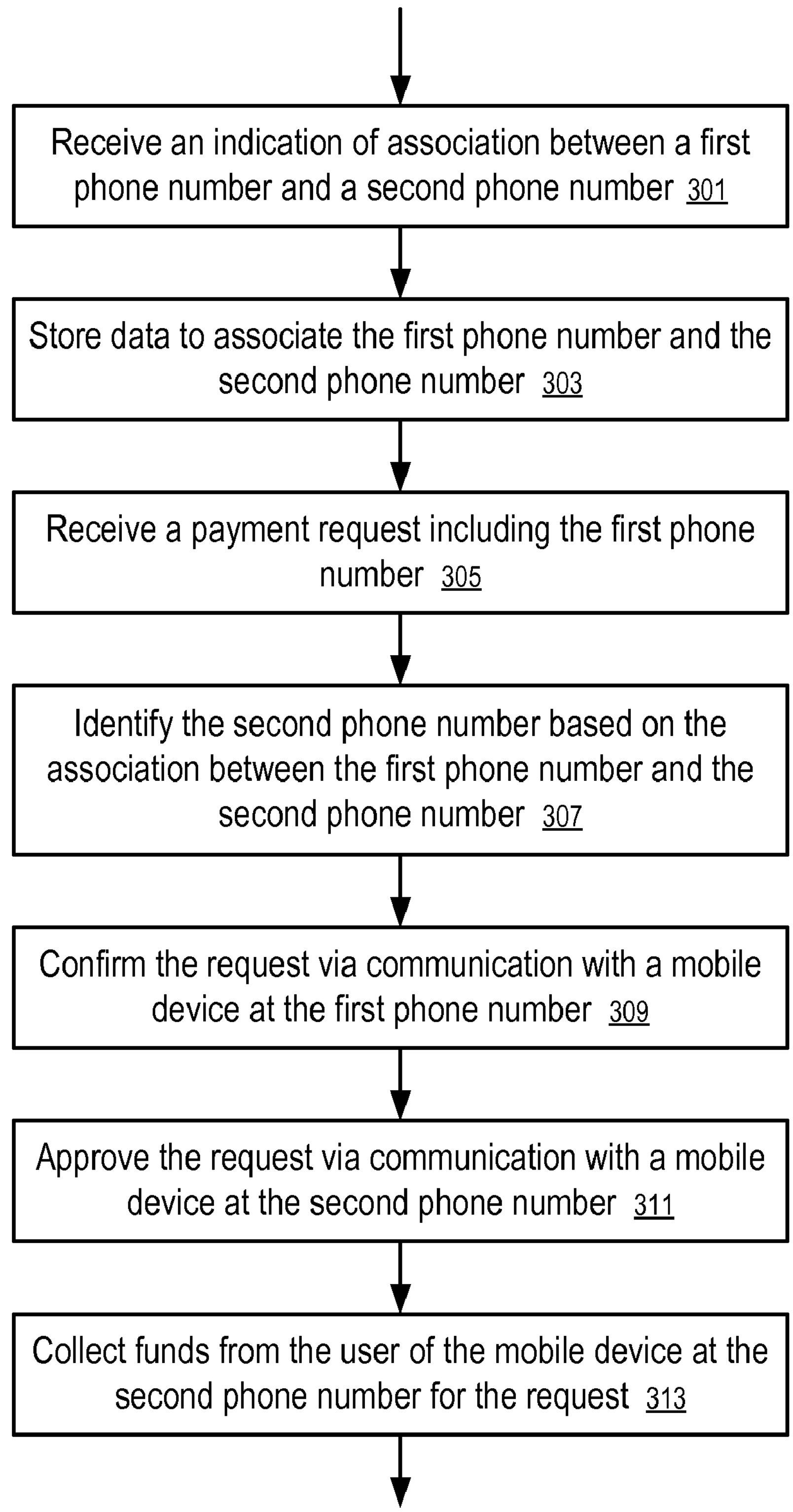
FIG. 19 shows a method to control an online payment according to one embodiment.

FIG. 19 shows a method to control an online payment according to one embodiment. In FIG. 19, the interchange (101) receives (301) an indication of association between a first phone number and a second phone number. The interchange (101) stores (303) data in the data storage facility (107) to associate the first phone number and the second phone number.

After the interchange (101) receives (305) a payment request including the first phone number, the interchange (101) identifies (307) the second phone number based on the association between the first phone number and the second phone number. The interchange (101) communicates with a mobile device at the first phone number to confirm (309) the request and communicates with a mobile device at the second phone number to approve (311) the request.

After the confirmation and approval of the purchase, the interchange (101) collects funds from the user of the mobile device at the second phone number for the request (313).

Figure 20:
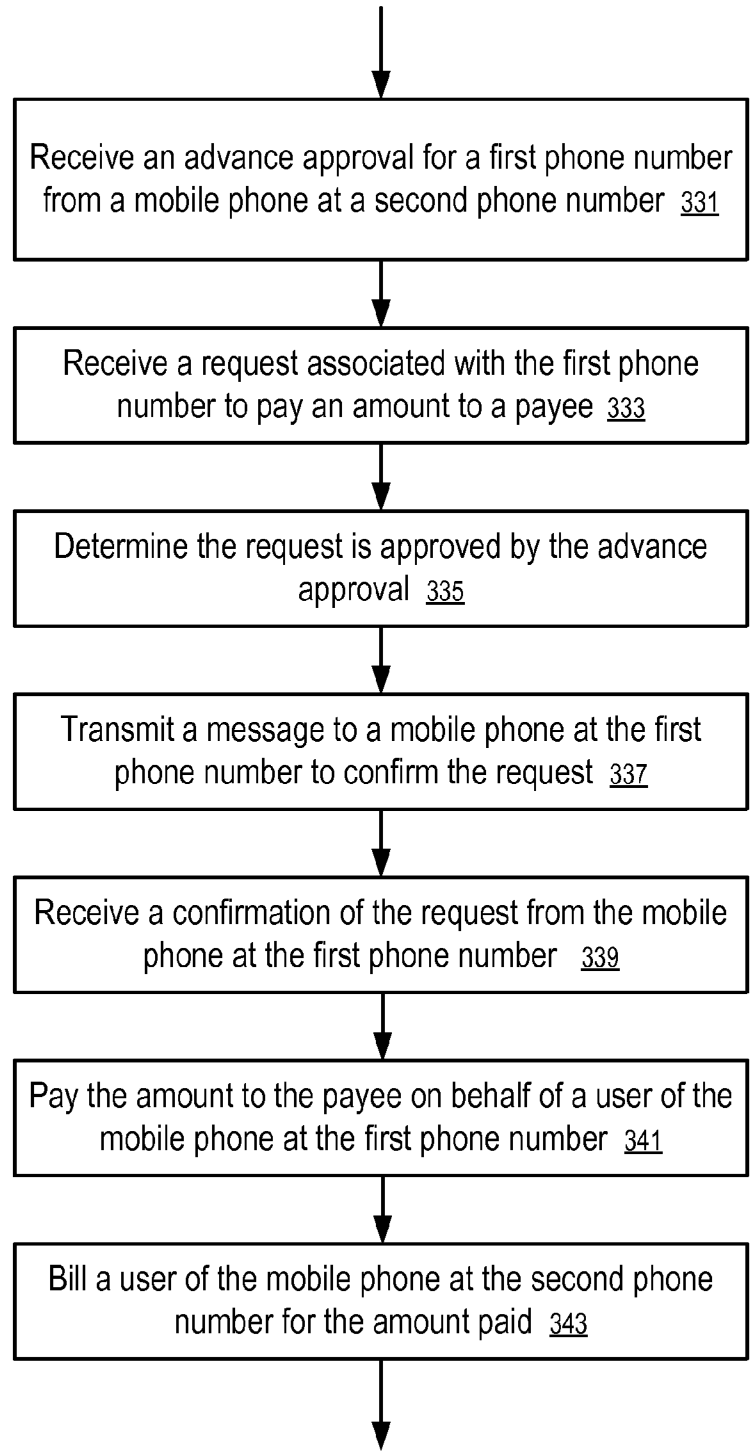
FIG. 20 shows another method to facilitate a payment transaction according to one embodiment.

FIG. 20 shows another method to facilitate a payment transaction according to one embodiment. In FIG. 20, the interchange (101) receives (331) an advance approval for a first phone number from a mobile phone at a second phone number. Subsequently, the interchange (101) receives (333) a request associated with the first phone number to pay an amount to a payee. If the interchange (101) determines (335) the request is approved by the advance approval, the interchange (101) transmits (337) a message to a mobile phone at the first phone number to confirm the request. If the interchange (101) receives (339) a confirmation of the request from the mobile phone at the first phone number, the interchange (101) pays (341) the amount to the payee on behalf of a user of the mobile phone at the first phone number and bills (343) a user of the mobile phone at the second phone number for the amount paid.

In one embodiment, the interchange (101) bills the user of the mobile phone at the second phone number for an amount equal to the purchase price plus a first fee and charges the merchant a second fee. In one embodiment, the merchant may specify the second fee. Different merchants may offer different percentages of the purchase prices as the second fee; and the interchange (101) may calculate the first fee based on the second fee offered by the merchant, by deducting the second fee from the total fees to be charged (e.g., the fees charged by the telecommunication carrier for collecting the funds via the mobile phone bill associated with the phone number and/or the fees charged by the interchange (101) for processing the payments). Since the first fee is charged to the customer (e.g., the payer of products and services), the cost to the customer can vary based on the selection of the merchant. For the same purchase prices, the first fee (and thus the cost to the customer) may be different for purchases made via different merchants, because the merchants may offer different percentages of the purchase price as the second fee. In some embodiments, the first and second fees include both fees charged by the telecommunication carrier for collecting the funds via the mobile phone bill/account associated with the phone number (123) and the fees charged by the interchange (101) for processing the payments. In some embodiments, the first fee includes the fees charged by the telecommunication carrier but no fees charged by the interchange (101). In some embodiments, the second fee includes the fees charged by the telecommunication carrier but no fees charged by the interchange (101). In some embodiments, the first fee and/or the second fee do not include the fees charged by the telecommunication carrier. In some embodiments, the first fee is not charged; and in other embodiments, the second fee is not charged.

In one embodiment, a social networking website is used to sell products and services, such as applications, games, access to online games, software, tokens, avatars, decoration/customization of avatars, and other virtual goods or tangible goods. The products and services can be sold to the members of the social network by other members of the social network, by third parties who might not be members of the social networking website, or by the social networking website. The products and services can be sold on the social networking website via advertisement, online stores, or via third party websites that allow the buyers to authenticate themselves via the social networking website for payment processing. In one embodiment, the social networking website is coupled to the interchange (101) to allow the members to pay for the purchases using mobile phones (e.g., 116).

In some embodiments, the interchange (101) (and/or the social networking website) determines scores based on data about the members in the social network, such as social graph, distance, geographical location, interest, preference, time of activities, number of shared friends in the social network, etc. The scores represent a measure of creditworthiness of the respective members (or the transactions between respective members). In some embodiments, the scores are not only specific to the members making the purchase, but also specific to the relationship between the seller and the buyer in relation to the social networking website.

In some embodiments, the members of the social networking website can use their social network credentials to purchase items hosted on third party websites, such as a casual game or a massively multiplayer online (MMO) game. A casual game typically has simple rules and does not require commitment from players. A massively multiplayer online (MMO) game enables players to cooperate and compete with each other on a large scale over a network, such as the Internet. The products or services of the third party websites may be advertised on, or hyperlinked from, the social network site, so that the login credentials of the social networking website may be used to authenticate the users on the third party websites.

Alternatively, the members of the social networking website may log in directly on the third party website, using the credentials of the respective members in the social network site. For example, the third party website may temporarily redirect the login credentials to the social networking website for verification and obtain an indication from the social networking website when the member is authenticated via the social networking website. The third party website may redirect the login credentials via a background communication with the social networking website, and/or via redirecting the web page to the social networking website. In some embodiments, the interchange (101) communicates with the social networking website to authenticate the buyer via the social networking website.

In one embodiment, the members of social networks can send money and/or gifts to other members and pay via their mobile phones using the interchange (101). The sender and the recipient may or may not be the members of the same social networks. The users may not request the transaction on the social networking websites. For example, a user may initiate the request on a web server of the interchange (101), which when determines that the user is a member of a social networking website, may forward the user to the social networking website for authentication (or communicating with the social networking website in the background to authenticate the user). To determine whether the user is a member of a social networking website, the interchange (101) may ask the user to identify whether the user is a member of a social networking website (e.g., to pay via presenting the credentials of the user as a member of a social networking website), and/or may check the data storage facility to association between a phone number submitted by the user to process payment and the member IDs of social networking websites.

Figure 21:
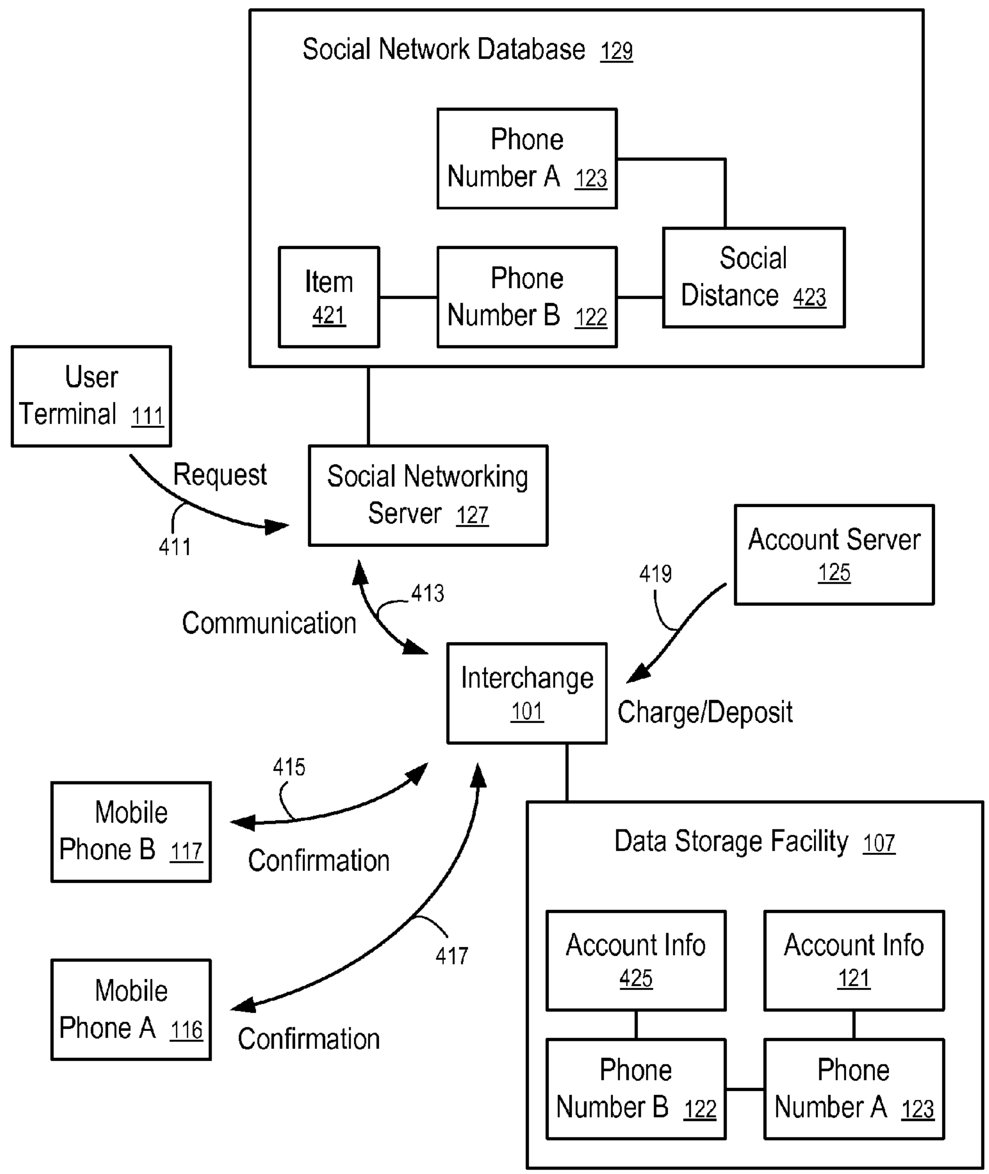
FIGS. 21-23 show systems to process transactions using a social networking website according to some embodiments.
Figure 22:
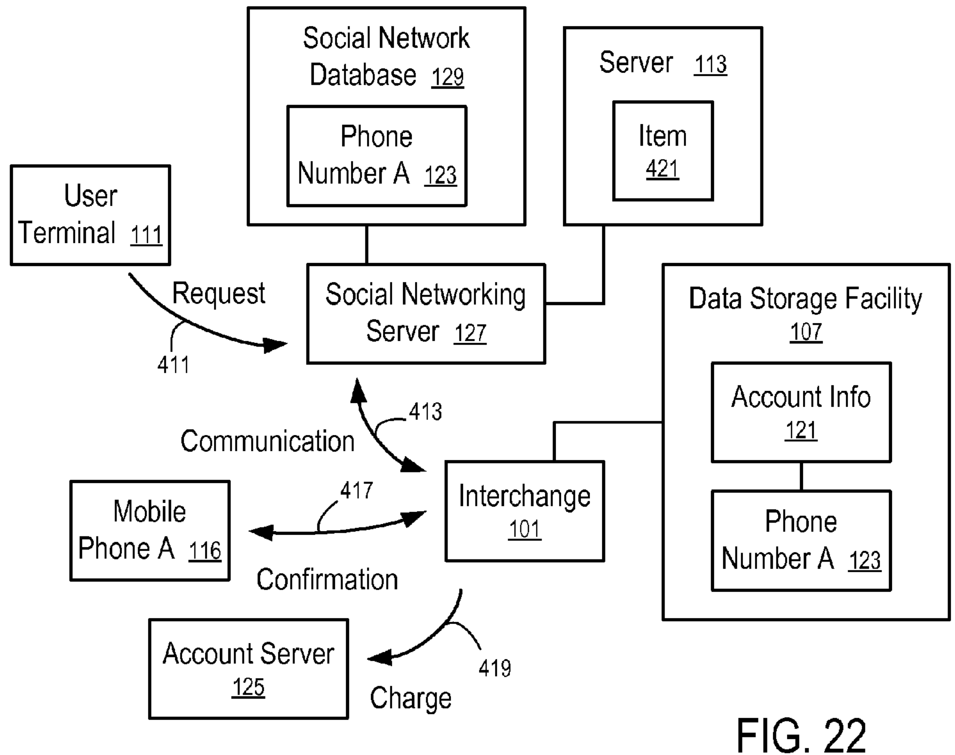
Figure 23:
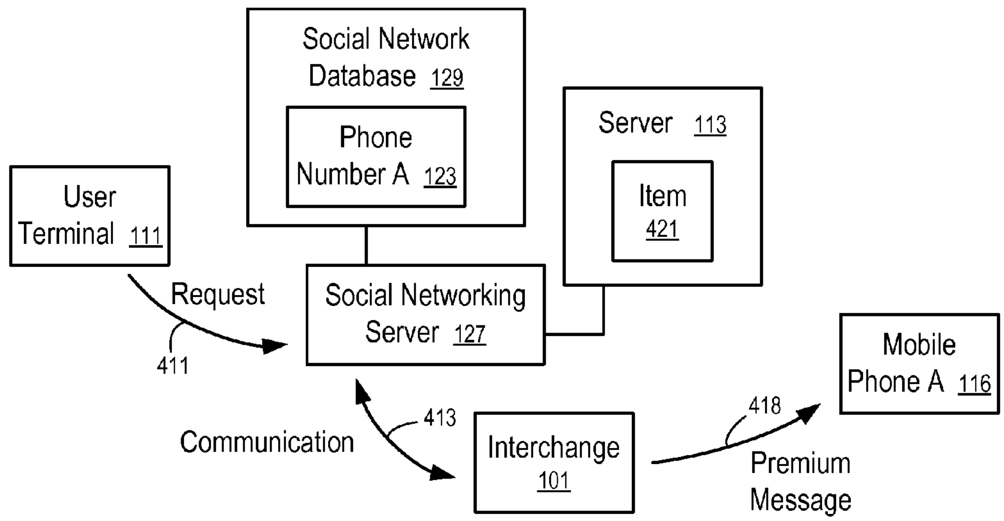

FIGS. 21-23 show systems to process transactions using a social networking website according to some embodiments.

In FIG. 21, a user of the mobile phone A (116) at the phone number A (123) may use the user terminal (111) to visit the social networking server (127) and make a request (411) involving a user of the mobile phone B (117) at the phone number B (122). The interchange (101) is configured to process the request via communicating with the social networking server (127).

In one embodiment, the user terminal (111) is a device distinct and separate from the mobile phone A (116). For example, the user terminal (111) may be a personal computer, a notebook computer, a personal digital assistant (PDA), etc. In other embodiments, the user terminal (111) is combined and/or integrated with the mobile phone A (116). For example, the user terminal may be a web browser implemented on the mobile phone A (116).

In one embodiment, the user terminal (111) is used to request access to the item (421) offered by the user at the phone number B (122). The item (421), for example, may be a blog entry, a photo image, a clip of audio and/or video recording, a program, or a virtual object.

In one embodiment, access to the item (421) may have a single price for any users who want to access the item (421), or may have a price based on the social distance (423) between the buyer at the phone number A (123) and the seller at the phone number B (122). In one embodiment, the social distance (423) is the smallest number of direct connections (e.g., friend connections) between the two users in a collection of connections stored in the social network database (129).

In one embodiment, access to the item (421) is limited to users within a predetermined threshold in the social distance to the user at the phone number B (122) who offers the item (421). The social networking server (127) and/or the interchange (101) accepts the transaction requests if the social distance (423) between the user at the phone number A (123) and the user at the phone number B (122) is within a predetermined threshold. The request may be rejected if the social distance (423) between the user at the phone number A (123) and the user at the phone number B (122) is not within a predetermined threshold.

In one embodiment, the interchange (101) confirms the request with the user at the phone number A (123) and/or the user at the phone number B (122), as a security measure, prior to performing the transaction specified by the request (411).

For example, the request may specify the transferring of funds from the user of the phone number A (123) to the user at the phone number B (122) (e.g., to purchase access to the item (421), to purchase the item (421), or without a purchase transaction). In such an example, the interchange (101) may communicate with the mobile phone A (116) for the confirmation (417) of the request. The interchange (101) may confirm the request by transmitting a message to the mobile phone A (116) to receive a reply to the message from the mobile phone A (116), or by receiving a code from the mobile phone A (116), or by receiving a code transmitted to the mobile phone A (116).

For example, the request may specify the transferring of funds from the user at the phone number B (122) to the user of the phone number A (123) (e.g., to request a loan, to sell an item or access to an item, to request funds as a gift). In such an example, the interchange (101) may communicate with the mobile phone B (117) for the confirmation (415) of the request (e.g., in addition to the confirmation (417) with the mobile phone A (116)). The interchange (101) may confirm the request by transmitting a message to the mobile phone B (117) to receive a reply to the message from the mobile phone B (117), or by receiving a code from the mobile phone B (117), or by receiving a code transmitted to the mobile phone B (117).

In one embodiment, the social distance between the user at the phone number A (123) and the user at the phone number B (122) is used to select a security measure for the confirmation of the transaction.

For example, when the social distance between the user at the phone number A (123) and the user at the phone number B (122) is within a predetermined threshold, the interchange (101) may perform the transaction specified by the request without sending a confirmation to the mobile phone A (116), or without waiting for a reply from the mobile phone A (116), or without waiting for a reply to the confirmation message sent to the mobile phone A (116).

For example, when the social distance between the user at the phone number A (123) and the user at the phone number B (122) is within a predetermined threshold, interchange (101) may perform the transaction specified by the request without sending a confirmation to the mobile phone B (117) at the phone number B (122), or without waiting for a reply from the mobile phone B (117), or without waiting for a reply to the confirmation message sent to the mobile phone B (117).

In one embodiment, the social distance between the user at the phone number A (123) and the user at the phone number B (122) and/or other social networking data can be used to determine whether a transaction is valid or permissible. For example, the user at the phone number A (123) may send a request to transfer money to the user at the phone number B (122); the interchange (101) can check the number of degrees separated, number of friends, number of friends in common, physical location stated on profile pages, years on the social network site, number of direction communications between the users in the social networking website, etc. to determine whether the transaction should be authorized. Thus, the social networking data can be used as the basis to determine a degree of trustworthiness between the users of the phone numbers (122 and 123); and the degree of trustworthiness can be used to determine a level of security measure applied to the requested transaction and/or to authorize the transaction.

In one embodiment, the interchange (101) transfers funds between the user at the phone number A (123) and the user at the phone number B (122) via the telecommunications carriers of the mobile phones (116 and 117). For example, the interchange (101) may charge a user by sending premium messages to the mobile phone A (116) to collect funds from the user of the mobile phone A (116), and/or to provide funds to a user by sending premium messages to the mobile phone B (117). In one embodiment, the interchange (101) determines a combination of premium messages, based on a set of predetermined prices for premium messages, to match the amount for the transaction. In some embodiments, the interchange (101) may send messages to the telecommunication carriers directly to provide funds or collect funds, without sending the messages to the mobile phones (116 and 117).

In some embodiments, the interchange (101) uses the account information (425 and 121) associated with the phone numbers (122 and 123) in the data storage facility (107) of the interchange (101) to perform the transaction. For example, the interchange (101) may use the account information (425 and 121) in its communication with at least one account server (125) to deposit (419) funds and/or to charge the users.

In one embodiment, the user terminal (111) may submit the request directly to the interchange (101), identifying both the phone numbers (122 and 123). The interchange (101) communicates with the social networking server (127) to determine whether the social distance (423) between the user at the phone number A (123) and the user at the phone number B (122) is within a predetermined threshold. For example, the interchange (101) may allow the transferring of funds between the users within a threshold of social distance. For example, the interchange (101) may provide discounts for the transferring of funds between the users within a threshold of social distance. For example, the interchange (101) may skip a confirmation message to the mobile phone A (116) or the mobile phone B (117) when the identity of the users have been confirmed via the social networking server (127).

In some embodiments, the interchange (101) obtains the list of friends from the social networking server (127) when the user registers with the interchange (101) (e.g., to provide the account information (121)). The list of friends may be updated periodically, or via notifications from the social networking server (127) when new friends are added to the social network database (129). The interchange (101) may limit the transferring of funds between direct friends in the social network.

In some embodiments, the interchange (101) maintains the social network database (129) to improve security of transactions.

In one embodiment, the interchange (101) allows a friend to pay for a purchase made by a user. For example, the user of the mobile phone A (116) may make a purchase at the social networking server (127) and request the friend at the mobile phone B (117) to pay for the purchase. The social network database (129) is used to verify the friend relationship before the interchange (101) transmits a message to the mobile phone B (117) to request confirmation (415).

In FIG. 22, the user may use the user terminal (111) to make a request (411) to purchase an item (421) offered by a server (113) via the social networking server (127). For example, the social networking server (127) may present an advertisement for the item (421) on the social networking website hosted on the social networking server (127). In response to the user making the request (411) to purchase the item (421), or to purchase access to the item (421), the social networking server (127) obtains the phone number A (123) (e.g., from the profile data of the user stored in the social network database (129)) and formulates a communication (413) to the interchange (101) to process the payment for the purchase. Thus, the user does not have to explicitly provide the phone number A (123) to process the request.

In some embodiments, the interchange (101) may present a confirmation message to the user terminal (111) before communicating with the mobile phone (116) to verify the identity of the user. The confirmation message sent to the user terminal (111) may include the phone number A (123), an identification of the item (421) and the price of the item (421). Thus, the user of the user terminal (111) has an opportunity to pay via a different phone number, if the user does not want to pay via the phone number A (123) identified from the social network database (129).

In response to the communication from the social networking server (127), the interchange (101) may communicate with the mobile phone A (116) at the phone number A (123) for confirmation (417) of the request and collect the funds from the user of the mobile phone A (116) via the telecommunication carrier of the mobile phone A (116). Alternatively, the interchange (101) may use the account information (121) associated with the phone number A (123) in the data storage facility (107) of the interchange (101) to charge (419) an account of the user via communicating with the account server (125).

After the processing of the payment, the interchange (101) notifies the social networking server (127) and/or the server (113) to complete the purchase. In some embodiments, the item (421) is a virtual object or a service offered by the server (113) which is separate from the social networking server (127). In some embodiments, the item (421) may be a object or a service offered by the social networking server (127). In some embodiments, the item (421) represents a physical object, or a service provided in person and/or outside a computer network.

In some embodiments, the interchange (101) may rely upon the social networking server (127) to authenticate the user and to eliminate the need to confirm the request (411) via the mobile phone A (116). For example, after the user uses the user terminal (111) to confirm the request to purchase the item (421) (or to purchase the access to the item (421)) via the phone number A (123) identified from the social network database (129), the interchange (101) may directly transmit the premium message (418) to the mobile phone A (116) at the phone number A (123) to collect the funds for the payment, as illustrated in FIG. 23. The user of the mobile phone A (116) may optionally reply to the premium message (418) to report error, abuse, or misuse, if the premium message (418) is not a result of the authorized use of the phone number A (123).

In some embodiments, the interchange (101) may require the user of the social networking website to at least confirm once the association between the user and the mobile phone A (116) via communications with the mobile phone A (116). After the association is confirmed, the interchange (101) may rely upon the social networking server (127) to authenticate the user and to eliminate the need to confirm the request (411) via the mobile phone A (116).

In one embodiment, the interchange (101) may determine a pattern of the transactions of the user of the social networking server (127) and match the current request (411) with the pattern. When there is a match, the interchange (101) may skip the requirement of a confirmation via the mobile phone A (116), prior to the transmission of the premium message (418).

In one embodiment, the social networking server (127) looks up the phone number A (123) of the user from the social network database (129), based on the identification of the user in the social networking website. The social networking server (127) provides the phone number A (123) to the interchange (101) as an identifier of the user of the user terminal (111).

In another embodiment, the social networking server (127) may identify the user to the interchange (101) using the identifier of the user in the social networking website, such as a user name of the user as known in the social networking website. When the user first uses the service of the interchange (101) via the social networking website hosted on the social networking server (127), the interchange (101) may prompt the user to provide the phone number (123) and associate the phone number (123) with the identifier of the user in the social networking website as provided by the social networking server (127). During subsequent uses, the interchange (101) can automatically identify the phone number (123) based on the association between the phone number (123) and the identifier of the user provided by the social networking server (127) (e.g., the user ID of the user in the social networking website).

In some embodiments, the phone number A (123) may be associated with another phone number B (122) in the data storage facility (107) so that the purchase made via the phone number A (123) is submitted to the mobile phone B (117) at the phone number B (122) for approval and/or charged to the user of the phone number B (122) (e.g., the phone bill of a parent phone, the credit card of the parent phone).

Figure 24:
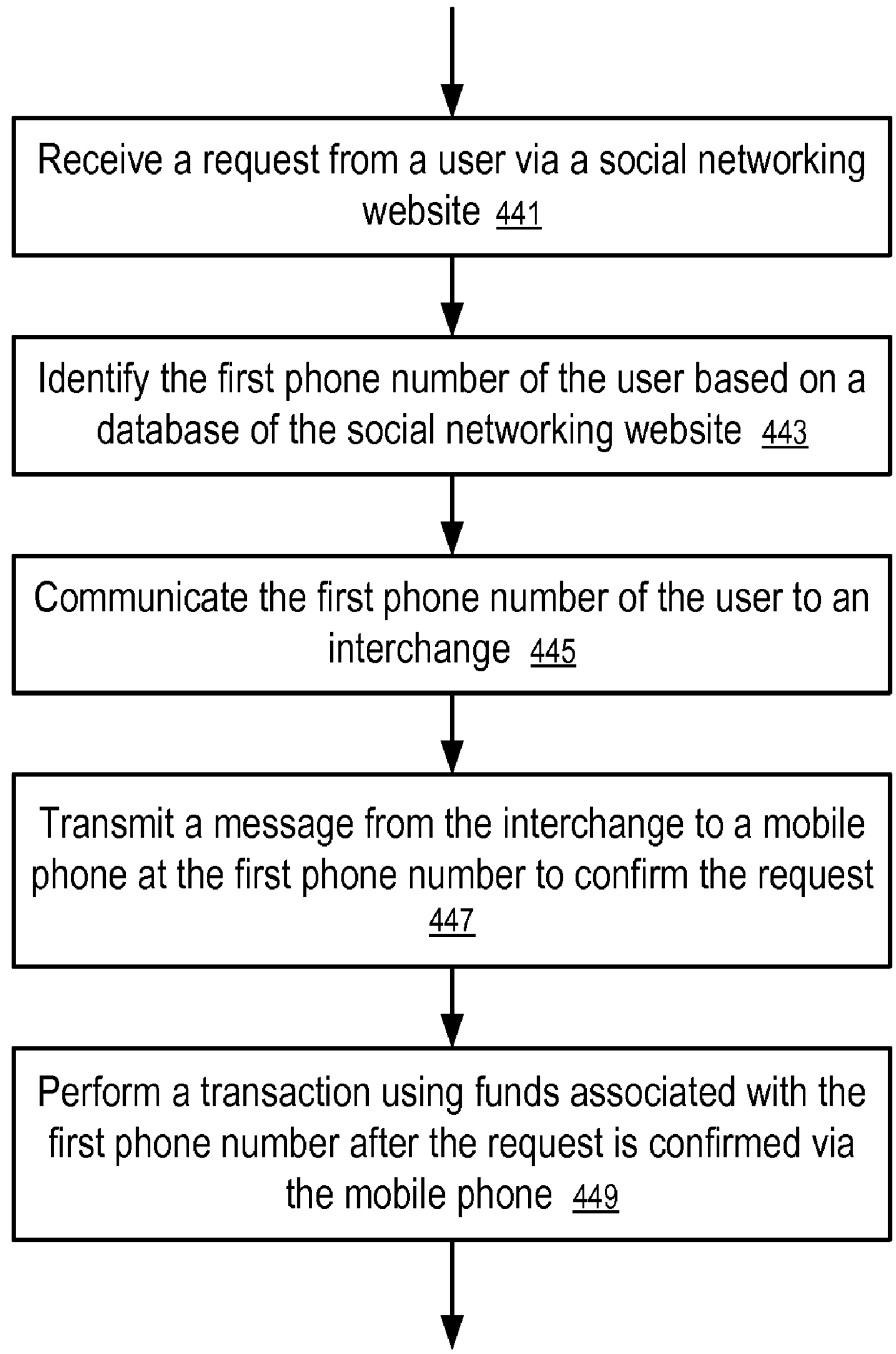
FIG. 24 shows a method to process a transaction request received via a social networking website according to one embodiment.

FIG. 24 shows a method to process a transaction request received via a social networking website according to one embodiment.

In FIG. 24, after a request (411) is received (441) from a user in a social networking website hosted on the social networking server (127), the first phone number (123) of the user is identified (443) based on a database (129) of the social networking website. The identified first phone number (123) of the user is communicated (445) from the social networking server (127) to the interchange (101), which transmits (447) a message to a mobile phone (116) at the first phone number (123) to confirm the request. After the confirmation (417) of the request via the mobile phone (116) at the first phone number (123), the interchange (101) performs (449) a transaction using funds associated with the first phone number (123).

Figure 25:
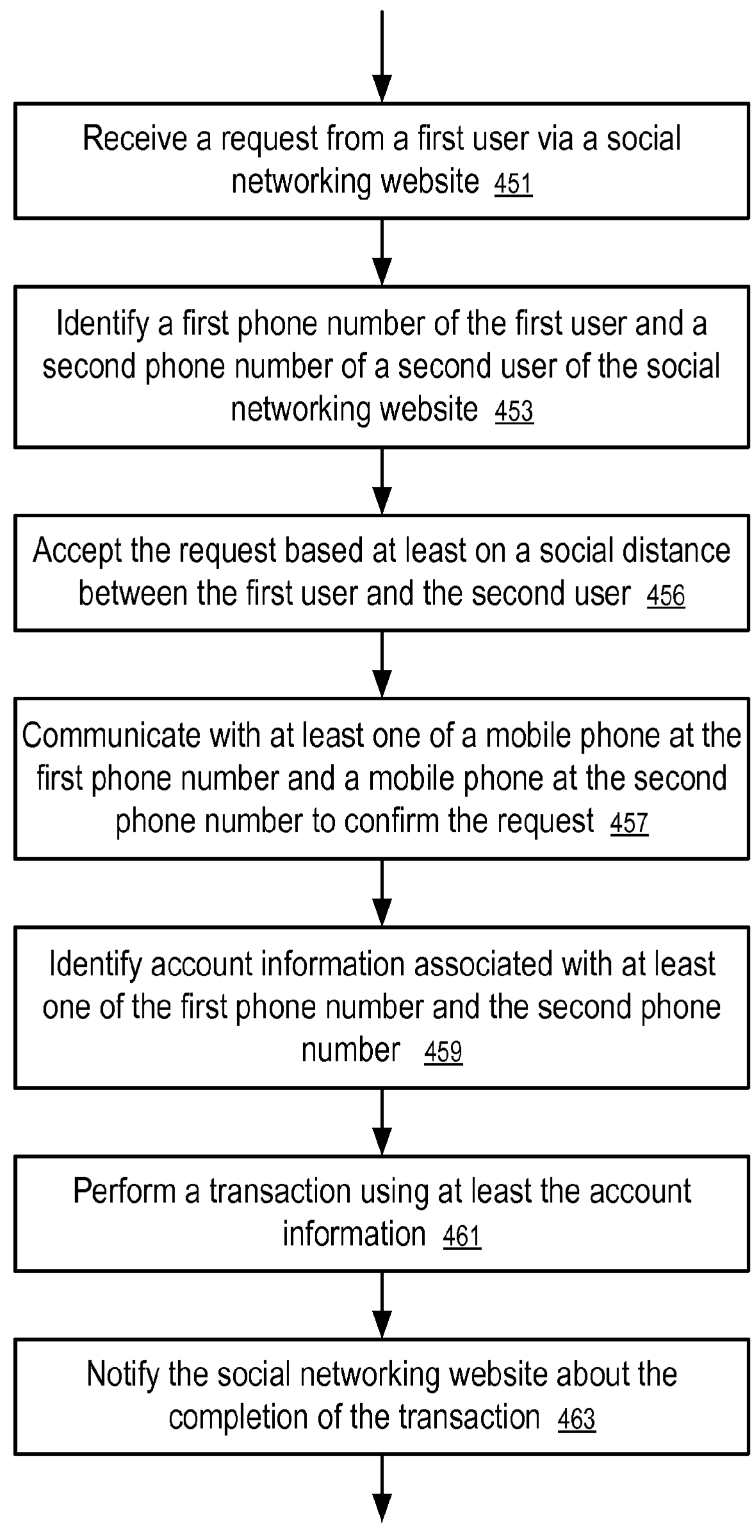
FIG. 25 shows a method to process a transaction between two users of a social networking website according to one embodiment.

FIG. 25 shows a method to process a transaction between two users of a social networking website according to one embodiment. In FIG. 25, a request is received (451) from a first user via a social networking website hosted on the social networking server (127). In response to the request, a first phone number (123) of the first user and a second phone number (122) of a second user of the social networking website are identified (453). The request may be accepted (456) based at least on a social distance (423) between the first user and the second user.

For example, the social network database (129) associates the first phone number (123) with the second phone number (122) based on a social network of the user. The interchange (101) may query the social networking server (127) to determine whether the social distance (423) between the users of the first and second phone number (122 and 123) is within a threshold.

For example, the social networking server (127) may forward the request to the interchange (101) after determining that the social distance (423) between the users of the first and second phone number (122 and 123) is within a threshold.

In one embodiment, the amount of the funds to be processed is based on a social distance between the user at the first phone number (123) and the user at the second phone number (122).

After accepting the request based on the social distance (423), the interchange (101) communicates (457) with at least one of a mobile phone A (116) at the first phone number (123) and a mobile phone B (117) at the second phone number (122) to confirm the request. In some embodiments, the interchange (101) communicates with both the mobile phones (116 and 117) to confirm the request. In other embodiments, the interchange (101) may skip the confirmation process and rely upon the social networking server (127) for authenticating the user.

In one embodiment, to perform the requested transaction, the interchange (101) identifies (459) account information (121 and/or 425) associated with at least one of the first phone number (123) and the second phone number (122). The interchange (101) performs (461) the transaction using at least the account information (121 and/or 425), such as the account number of a credit card, a debit card, or a bank account, or a stored value account hosted on the data storage facility (107) of the interchange (101).

For example, the interchange (101) may provide funds from the user at the first phone number (123) to the user at the second phone number (122), e.g., via transmitting at least one premium message to the mobile phone A (116) to collect the funds from a telecommunication carrier of the mobile phone A (116) at the first phone number (123) and/or transmitting at least one premium message to a mobile phone B (117) at the second phone number (122) to provide the funds via a telecommunication carrier of the mobile phone B (117) at the second phone number (122). In one embodiment, the interchange (101) determines the set of premium messages based on an amount of the funds required to fulfill the request and a set of predetermined prices of premium messages.

The interchange (101) notifies (463) the social networking website about the completion of the transaction, such that the social networking website may release the item purchased by the first user, to provide the first user with the access to the item, etc. The item may be an image, a video clip, an audio clip, an article, or a virtual object. Alternatively, the item may be a physical object to be shipped to the user at the first phone number (123) (e.g., via an arrangement by the social networking server (127), or by a third party server (113).

In one embodiment, the interchange (101) transfers funds to the user at the first phone number (123) from the user at the second phone number (122), according to the request; and the interchange (101) communicates with a mobile phone B (117) at the second phone number (122) to confirm the request. Further, the interchange (101) may reject such a request when the social distance (423) between the user at the first phone number (123) and the user at the second phone number (122) is above a predetermined threshold (e.g., not a direct friend in the social network database (129)).

Figure 26:
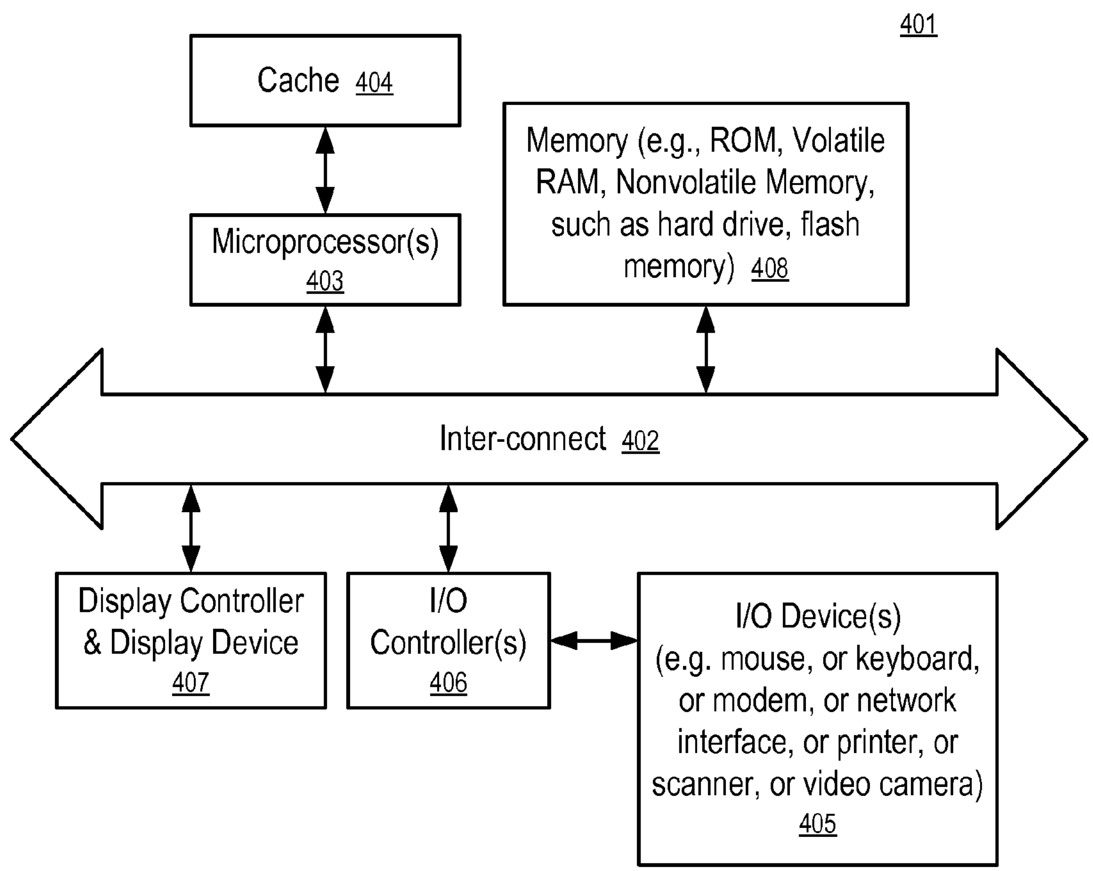
FIG. 26 shows a data processing system, which can be used in various embodiments.

FIG. 26 shows a data processing system, which can be used in various embodiments. While FIG. 26 illustrates various components of a computer system, it is not intended to represent any particular architecture or manner of interconnecting the components. Some embodiments may use other systems that have fewer or more components than those shown in FIG. 26.

In one embodiment, each of the interchange (101), the data storage facility (107), the controllers (115), the mobile phones (e.g., 116, 117), the user terminals (111), the account server (125) and the servers (113) can be implemented as a data processing system, with fewer or more components, as illustrated in FIG. 26. In one embodiment, the interchange (101) is a server computer system implemented using a data processing system illustrated in FIG. 26, without some of the components (e.g., a display device).

In FIG. 26, the data processing system (401) includes an inter-connect (402) (e.g., bus and system core logic), which interconnects a microprocessor(s) (403) and memory (408). The microprocessor (403) is coupled to cache memory (404) in the example of FIG. 26.

The inter-connect (402) interconnects the microprocessor(s) (403) and the memory (408) together and also interconnects them to a display controller, display device (407), and to peripheral devices such as input/output (I/O) devices (405) through an input/output controller(s) (406).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

The computer-readable media may store the instructions. The instructions may also be embodied in digital and analog communication links for electrical, optical, acoustical or other forms of propagated signals, such as carrier waves, infrared signals, digital signals, etc.

In general, a tangible machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method implemented on a data processing system, the method comprising:

receiving at a server computer of a mobile phone interchange a request from a first user via a social networking website of a social networking system, the request identifying a first phone number of the user;

communicating by the server computer of the mobile phone interchange with the social networking website of the social networking system to identify a second phone number of a second user based on data stored in a social network database of the social networking system coupled to the social networking website the data including a social distance between the users having the first and second phone numbers;

communicating by the server computer of the mobile phone interchange with a mobile phone at the first phone number to confirm the request;

determining whether the user at the second phone number is within a predetermined social distance from the user at the first phone number;

in response to a confirmation of the request confirmed via the mobile phone at the first phone number, transferring, by the server computer of the mobile phone interchange, funds between the user at the first phone number and a user at the second phone number according to the request, wherein the providing the funds is in response to a determination that the user at the second phone number is within a predetermined social distance from the user at the first phone number in the social network of the user at the first phone number; and Wherein the social distance is the smallest number of direct connections (ea friend connections) between the two users in a collection of connections stored in the social network database.

2. The method of claim 1, wherein the social network database associates the first phone number with the second phone number based on a social network of the user.

3. The method of claim 1, wherein the transferring funds comprises providing funds from the user at the first phone number to the user at the second phone number.

4. The method of claim 3, wherein the providing of the funds comprises:

transmitting at least one premium message to the mobile phone to collect the funds from a telecommunication carrier of the mobile phone at the first phone number.

5. The method of claim 4, wherein the providing of the funds comprises:

determining at least one premium message based on an amount of the funds required to fulfill the request and a set of predetermined prices of premium messages; and transmitting the at least one premium message to a mobile phone at the second phone number to provide the funds via a telecommunication carrier of the mobile phone at the second phone number.

6. The method of claim 4, wherein the funds are provided to a stored value account hosted on the server computer.

7. The method of claim 3, wherein the communicating with the social networking website is in response to the request.

8. The method of claim 3, further comprising:

identifying account information of the user at the second phone number based on association between the second phone number and the account information in a database coupled to the server computer;

wherein the account information is used to receive the funds on behalf of the user at the second phone number.

9. The method of claim 3, further comprising:

identifying account information of the user at the first phone number based on association between the first phone number and the account information in a database coupled to the server computer;

wherein the account information is used to charge the user at the first phone number to collect the funds.

10. The method of claim 9, wherein the account information comprises an account number of one of: a credit card account, a debit card account, and a bank account.

11. The method of claim 3, further comprising:

communicating with the social networking website to release to the user at the first phone number an item, offered by the user at the second phone number in exchange for the funds, in response to the providing of the funds.

12. The method of claim 11, wherein the item comprises one of: an image, a video clip, an audio clip, an article, and a virtual object.

13. The method of claim 11, wherein the item comprises a physical object to be shipped to the user at the first phone number.

14. The method of claim 2, wherein the transferring funds comprises providing funds to the user at the first phone number from the user at the second phone number, and the method further comprises:

communicating by the server computer with a mobile phone at the second phone number to confirm the request.

15. The method of claim 14, wherein the communicating with the mobile phone at the second phone number is in response to a determination that a social distance between the user at the first phone number and the user at the second phone number is within a predetermined threshold; and the request is rejected if the social distance is above the predetermined threshold.

16. A system, comprising:

a data storage facility to store data associated with a first phone number; and a mobile phone interchange coupled with the data storage facility, the mobile phone interchange including a common format processor and a plurality of converters to interface with a plurality of controllers, the converters configured to communicate with the controllers in different formats, the converters to communicate with the common format processor in a common format, the common format processor to receive a request from a user via a social networking website of a social network system, the request identifying the first phone number of the user, the common format processor to communicate with the social networking website of the social network system to identify a second phone number of a second user based on data stored in a social network database of the social network system coupled to the social networking website of the social network system, the social network database including data with a social distance between the users of the first phone number and the second phone numbers based on a social network of the user, the common format processor to instruct a first controller of the controllers, via a first converter of the converters, to communicate with a mobile phone at the first phone number to confirm the request, and to determine whether the user at the second phone number is within a predetermined social distance from the user at the first phone number;

wherein in response to a confirmation of the request confirmed via the mobile phone at the first phone number, the system is to transfer funds between the user at the first phone number and a user at the second phone number according to the request wherein the providing the funds is in response to a determination that the user at the second phone number is within a predetermined social distance from the user at the first phone number in the social network of the user at the first phone number; and Wherein the social distance is the smallest number of direct connections (e.g. friend connections) between the two users in a collection of connections stored in the social network database.

17. A non-transitory computer-readable storage media storing instructions, the instructions causing a server computer to perform a method, the method comprising:

receiving at a server computer of a mobile phone interchange a request from a first user via a social networking website of a social networking system, the request identifying a first phone number of the user;

communicating by the server computer of the mobile phone interchange with the social networking website of the social networking system to identify a second phone number of a second user based on data stored in a social network database of the social networking system coupled to the social networking website the data including a social distance between the users having the first and second phone numbers;

communicating by the server computer of the mobile phone interchange with a mobile phone at the first phone number to confirm the request;

determining whether the user at the second phone number is within a predetermined social distance from the user at the first phone number;

in response to a confirmation of the request confirmed via the mobile phone at the first phone number, transferring, by the server computer of the mobile phone interchange, funds between the user at the first phone number and a user at the second phone number according to the request, wherein the providing the funds is in response to a determination that the user at the second phone number is within a predetermined social distance from the user at the first phone number in the social network of the user at the first phone number; and Wherein the social distance is the smallest number of direct connections (e.g. friend connections) between the two users in a collection of connections stored in the social network database.

* * * * *